US008015545B2

(12) United States Patent
Seto et al.

(10) Patent No.: US 8,015,545 B2
(45) Date of Patent: Sep. 6, 2011

(54) METHOD FOR CONFIGURING AN ADAPTER SOFTWARE COMPONENT TO SELECTIVELY ACCESS SOFTWARE OBJECTS AND OBJECT EDITOR USING INSTANCE OF SAME

(75) Inventors: Norman K. Seto, North York (CA); Jean-Sebastien Delfino, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 11/781,469

(22) Filed: Jul. 23, 2007

(65) Prior Publication Data

US 2007/0261025 A1 Nov. 8, 2007

Related U.S. Application Data

(63) Continuation of application No. 10/314,806, filed on Dec. 9, 2002, now Pat. No. 7,272,819.

(30) Foreign Application Priority Data

Feb. 13, 2002 (CA) ..................................... 2371646

(51) Int. Cl.
   *G06F 9/44* (2006.01)
(52) U.S. Cl. .......................... 717/108; 717/106; 717/109
(58) Field of Classification Search .................. None
   See application file for complete search history.

(56) References Cited

U.S. PATENT DOCUMENTS

| 5,784,583 | A | * | 7/1998 | Redpath ....................... 715/841 |
| 5,878,425 | A | * | 3/1999 | Redpath .............................. 1/1 |
| 5,913,063 | A | * | 6/1999 | McGurrin et al. ............ 717/109 |
| 6,023,271 | A | | 2/2000 | Quaeler-Bock et al. |
| 6,199,195 | B1 | | 3/2001 | Goodwin et al. |
| 6,209,124 | B1 | | 3/2001 | Vermeire et al. |
| 6,209,125 | B1 | | 3/2001 | Hamilton et al. |
| 6,253,366 | B1 | | 6/2001 | Mutschler, III |
| 6,668,371 | B2 | | 12/2003 | Hamilton et al. |
| 6,754,671 | B2 | | 6/2004 | Hrebejk et al. |

(Continued)

OTHER PUBLICATIONS

Fowler, Amy "A Swing Architecture Overview" as posted at <http://java.sun.com/products/jfc/tsc/articles/architecture/> and archived by the web archive project <http://www.archive.org/web/web.php> on Jun. 2001.*

Horstmann et al., "Core Java2 vol. II—Advanced Features", Sun Microsystems, Inc., 2000, pp. 319-358, 648-685.

(Continued)

*Primary Examiner* — Jason D Mitchell

(74) *Attorney, Agent, or Firm* — Stephen J. Walder, Jr.; Jeffrey S. LaBaw

(57) ABSTRACT

An object editor capable of displaying a set of application software objects, which may include objects with a dynamic reflection capability ("reflective objects"), includes an object oriented configuration model instance (CMI), a generic adapter, and a UI framework. The CMI is particular to the set of application objects to be edited and defines a particular view of these objects to be provided by the editor. The CMI is external to the generic adapter and includes settings that control which application objects will be accessed and the manner of access. The generic adapter reads the de-serialized CMI's current settings, selectively accesses the set of application objects to be edited and their attributes as dictated by the CMI settings, and passes the accessed information to the LII framework for display.

17 Claims, 14 Drawing Sheets

U.S. PATENT DOCUMENTS

| | | | |
|---|---|---|---|
| 2002/0099738 A1 | 7/2002 | Grant | |
| 2002/0133811 A1* | 9/2002 | Duftler et al. | 717/140 |
| 2002/0184610 A1* | 12/2002 | Chong et al. | 717/109 |
| 2002/0188616 A1* | 12/2002 | Chinnici et al. | 707/102 |
| 2004/0015858 A1 | 1/2004 | Seto et al. | |
| 2004/0205706 A1* | 10/2004 | Portwood | 717/113 |

OTHER PUBLICATIONS

"Meta Object Facility (MOF) Specification Version 1.3", Object Management Group, Inc., Mar. 2000, available for download at http://www.omg.org/cgi-bin/doc?formal/00-04-03.

* cited by examiner

```
1   <Editor id="BankEditor">
2       <navigators id="Navigator_1" startType="Bank"/>
3   </Editor>
4
5   <ModelItem icon="bank.gif" displayName="Bank:" name="Bank"
6       label="Bank_name">
7     <navigators id="Navigator_2" path="clients"/>
8     <properties id="Bank_name" displayName="Bank Name"
9         name="name" icon="ppty.gif"/>
10    <properties id="Bank_location" displayName="Bank Location"
11        name="location" icon="ppty.gif"/>
12  </ModelItem>
13
14  <ModelItem icon="client.gif" displayName="Client:"
15      name="Client"  label="Client_name">
16    <navigators id="Navigator_3" path="accounts"/>
17    <properties id="Client_name" displayName="Name"
18        name="name" icon="ppty.gif"/>
19  </ModelItem>
20
21  <ModelItem icon="account.gif" displayName="Account:"
22      name="Account" label="Account_name">
23    <properties id="Account_number"  icon="ppty.gif"
24        displayName="Account number" name="number"/>
25    <properties id="Account_Balance" displayName="Balance"
26        name="balance" icon="ppty.gif"/>
27    <navigators id="Navigators_nopath"/>
28  </ModelItem>
29
30  <Property id="Account_name" displayName="" name="name"/>
```

FIG. 6A

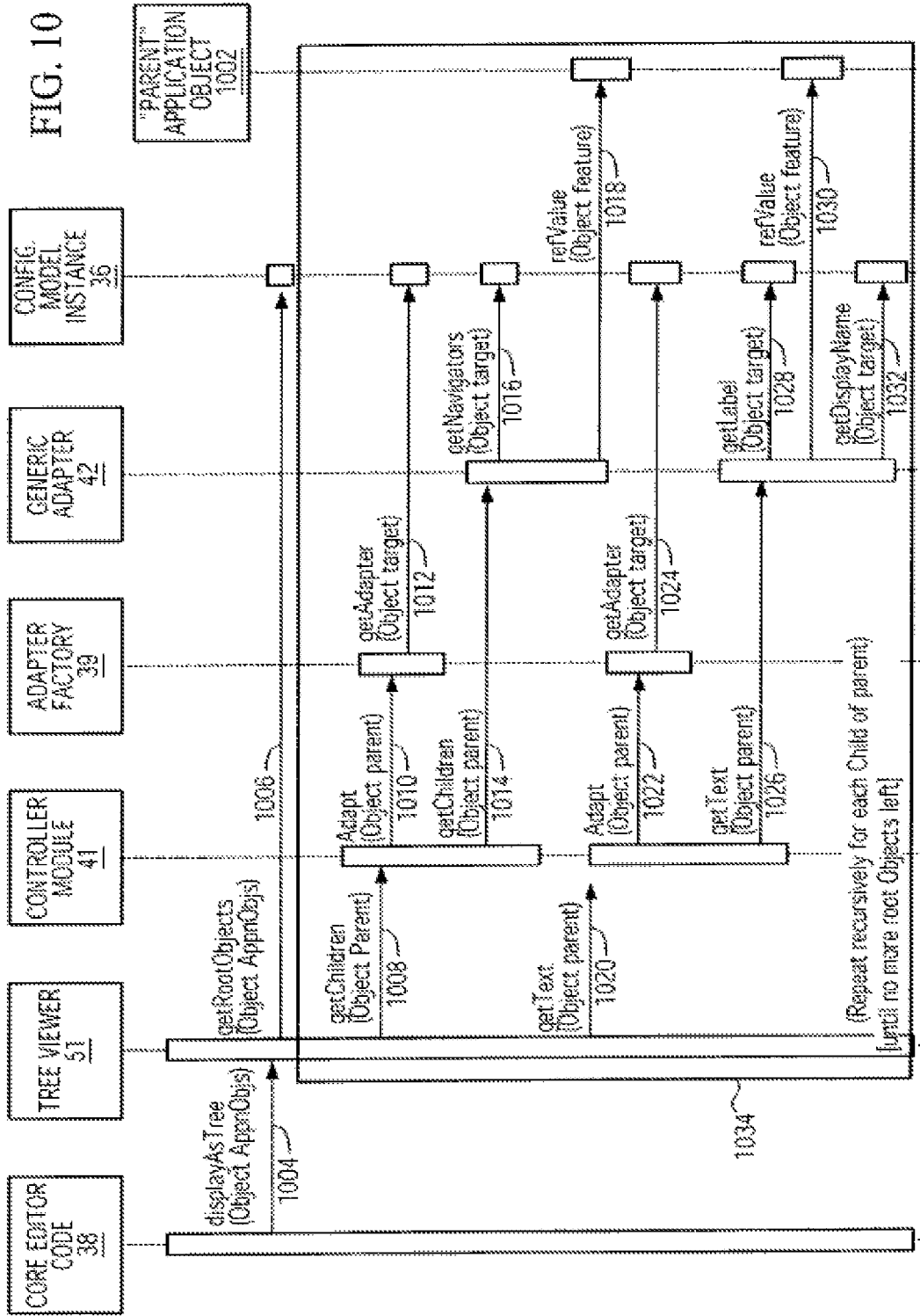

```
<xmi:XMI xmi:version="2.0" xmlns:xmi="http://www.omg.org/XMI"
    xmlns:CTCEditor="CTCEditor.xmi">

<CTCEditor:Editor xmi:id="Editor_1" id="BankEditor">
    <navigators xsi:type="CTCEditor:ModelNavigator" xmi:id="Navigator_1"
        startType="Bank"/>
  </CTCEditor:Editor>

<CTCEditor:ModelItem xmi:id="Bank_Item" icon="bank.gif" displayName="Bank:"
      name="Bank" label="Bank_name">
    <navigators xsi:type="CTCEditor:ModelNavigator" xmi:id="Client_Navigator"
        path="clients"/>
    <properties xmi:id="Bank_name" displayName="Bank Name" name="name"
        icon="ppty.gif"/>
    <properties xmi:id="Bank_location" displayName="Bank Location" name="location"
        icon="ppty.gif"/>
  </CTCEditor:ModelItem>

<CTCEditor:ModelItem xmi:id="Client_Item" icon="client.gif" displayName="Client:"
      name="Client" label="Client_name">
    <navigators xsi:type="CTCEditor:ModelNavigator" xmi:id="Account_Navigator"
        path="accounts"/>
    <properties xmi:id="Client_name" displayName="Name" name="name"
        icon="ppty.gif"/>
  </CTCEditor:ModelItem>

<CTCEditor:ModelItem xmi:id="Account_Item" icon="account.gif"
      displayName="Account:" name="Account" label="Account_name">
    <properties xmi:id="Account_number" displayName="Account number"
        name="number" icon="ppty.gif"/>
    <properties xmi:id="Account_balance" displayName="Balance"
        name="balance" icon="ppty.gif"/>
    <navigators xmi:id="Navigator_nopath" />
  </CTCEditor:ModelItem>

<CTCEditor:Property xmi:id="Account_name" displayName="" name="name"/>

</xmi:XMI>
```

FIG. 11

METHOD FOR CONFIGURING AN ADAPTER SOFTWARE COMPONENT TO SELECTIVELY ACCESS SOFTWARE OBJECTS AND OBJECT EDITOR USING INSTANCE OF SAME

This application is a continuation of application Ser. No. 10/314,806, filed Dec. 9, 2002, now U.S. Pat. No. 7,272,819 status allowed.

FIELD OF THE INVENTION

The present invention relates to adapter software components, and more particularly to adapter software components that are configurable with an external configuration model instance to selectively access software objects. The invention further relates to object editors which use such adapter software components.

BACKGROUND OF THE INVENTION

In recent years, software developers have become increasingly reliant upon computer aided software engineering (CASE) tools. This is due, at least in part, to increasing consumer demand for software of greater complexity and improved reliability. CASE tools characteristically permit software to be abstracted to a level at which architectures and designs are more apparent than in their source code form, and may thus speed robust development.

In the realm of object oriented (OO) software design, one type of CASE tool that may be of considerable benefit to a software developer is the OO model editor (or simply "model editor"). Model editors, such as the Rational Rose® Unified Modeling Language (UML) model editor, promote improved visualization and comprehensibility of object oriented designs by permitting a developer to view and edit abstract classes for a particular application graphically, for example. Model editors and associated tools, such as the "add-in" extensions to the Rational Rose® model editor, may be capable of automatically generating object oriented programming language (OOPL) code corresponding to a graphically-created model, to facilitate the often tedious task of software implementation.

A related type of software tool is the object editor. Unlike the odel editor, which edits OO models (i.e. abstract classes), an object editor is capable of displaying and editing software objects (i.e. instances of modeled classes). Though not CASE tools, object editors are nevertheless beneficial in that, like model editors, they promote improved visualization and comprehensibility of object oriented entities (for clarity, the term "object editor" herein should be understood to include applications which merely display objects but are not necessarily capable of updating the objects).

An object editor may be implemented in accordance with the Model View Controller (MVC) paradigm. As known by those skilled in the art, the MVC paradigm dictates that an application's representation of "real-world" entities, its user interface, and its manner of mapping the real world entity representations to the user interface shall be handled by way of a separate "Model" component, "View" component, and "Controller" component, respectively. A benefit of adopting the MVC paradigm is modularity and component reusability.

In an MVC compliant object editor, the objects being edited may comprise the "Model" component, as the objects typically represent "real world" entities. A known UI framework, such as the Java™ Foundation Class Swing components from SUN® Microsystems ("Swing"), may be chosen to comprise the "View" component. A UI framework such as Swing provides the basic UI constructs (e.g. windows, buttons, menus, etc.) for implementing a graphical user interface (GUI) and may advantageously be familiar to the user. A UI framework may further include high level constructs which facilitate such operations as displaying a set of objects in the form of a tree (e.g. the javax.swing.Jtree construct of Swing) or as a table. Finally, the "Controller" component may comprise a UI framework controller module (e.g., in the case of Swing, javax.swing.tree.TreeModel) which is designed to map certain generic methods (e.g. getChildren, getText or the like) to logically analogous methods in application objects to be edited (e.g., for a bank object, getAccount and getBankName, respectively). This mapping facilitates a tree-like or tabular display that is logical with respect to the nature of the displayed objects. As known to those skilled in the art, the UI framework's higher level constructs are segregated from the UI framework controller module for reasons of code efficiency; many of the mapping functions implemented by the controller module may be needed by more than one high level construct (e.g. a tree display construct and a table display construct may both need to invoke a "getText" method for a displayed object).

In certain implementations, the "Controller" component of an MVC compliant object editor may further include an adapter. As known to those skilled in the art, an adapter is a software component (e.g. an object) which converts the interface of one or more classes to an interface expected by a client, which in the instant case is the UI framework controller module. Adapters are described in the text Design Patterns: *Elements of Reusable Object Oriented Software* by Erich Gamma et al., 1995, Addison Wesley (Chapter 4). In the instant case, the adapter adapts the interface of the objects to be edited (i.e. the "Model") to the interface expected by the UI framework controller module and thus "adapts" the objects of interest to the UI framework.

Some object editors may be capable of use with objects which incorporate a dynamic reflection capability. As known to those skilled in the art, reflection is the capacity of a software object to have its characteristics determined dynamically through "examination" of the object at run time. In simple terms, reflection permits an object to be dynamically queried as to the attributes that it possesses and its associations with other objects (which may be referred to herein as its "relatives"). Software objects with this capability may be interacted with even in the case where the object's attributes (e.g. fields) and associations with relatives (e.g. children) are not known at the time of implementation.

For example, an object having a dynamic reflection capability (referred to herein as a "reflective" object) which comprises an instantiated OOPL class representative of, say, an automobile, may be interrogated at run time as to its characteristics, and in response may indicate that it has four attributes named "make", "model", "color", and "year" and two associations with other objects, namely an "owner" object and a "dealer" object. Further, this reflective object may provide the current values of these attributes and references to the associated "relative" objects. All of this is possible despite the interrogator's initial lack of awareness that the object under interrogation was in fact representative of an automobile.

An example of objects possessing this dynamic reflection capability is Meta Object Facility (MOF) compliant objects. As known to those skilled in the art, MOF is a standard defined by the Object Management Group (OMG) for managing meta information. MOF is not in itself a programming language, but rather may be implemented in a chosen OOPL (e.g. Java™), in the form of a software component such as a "MOF package" for example, which may be incorporated into objects (e.g. by way of object oriented inheritance) to provide them with MOF capabilities. Objects that are created in this manner are said to be "MOF compliant" and may be referred to simply as MOF objects. The creation of MOF objects may be facilitated by software tools similar to those which create OOPL code from a graphical (e.g. UML) model, which may be used in conjunction with the Rational Rose® Model Editor.

The dynamic reflection capability of MOF objects is facilitated by MOF's "reflective module", through which "meta-objects" associated with the MOF objects may be accessed. As known by those skilled in the art, it is these meta-objects that provide the above described object "meta-information" regarding MOF object characteristics (e.g. a "meta-automobile" object can return information regarding the characteristics of a corresponding "automobile" object at run time, as described above).

In the context of the above-described MVC compliant object editor, a benefit which arises when the objects being edited are reflective is that the adapter may in some respects be made more generic. That is, rather than containing specific "hard-coded" references to particular attributes, relationships or methods of an object being edited, the adapter may utilize more generic reflection tools (e.g. in the case of MOF objects, reflective module methods such as refMetaobject, refValue, refSetValue, etc.) to gain access to the attributes and relationships of the object(s) being edited by way of the associated meta-objects.

Disadvantageously, however, the adapter component cannot be made entirely generic. This is because, despite the use of the reflection within the adapter code, at some level (e.g. in the context of parameters to reflective module methods) the adapter still "hard-codes" which application objects, attributes and associations should be accessed to effect the desired "view" of the displayed objects. For example, if it is desired to display an automobile object's "color" attribute in the operative view, the corresponding reflective method invocation within the adapter code is required, at a minimum, to specify the "color" attribute of the automobile object as the attribute name for which a current value reading is required. Disadvantageously, if it is desired to change the way in which objects or attributes are displayed (e.g. which application objects and attributes are visible or the arrangement of object data), or if it becomes necessary to use the editor with a new class of objects with different attributes and associations, the adapter code must be painstakingly updated and then recompiled in order to effect the desired changes. This constraint impacts negatively on the object editor's flexibility.

In applications other than object editors, adapter software components may be used to conform the interface of one or more application object classes to an interface expected by a client. The role served by the adapter in such applications is similar to the aforedescribed role of the adapter in an object editor, with the exception that the client in such cases is not a UI framework but rather some other software component. Here too, adapters suffer from a problem similar to the one described above: if it is desired to change the way in which application objects or attributes are accessed by the adapter, or if it becomes necessary to use the adapter with a new class of objects with different attributes and associations, the adapter code must be edited and then recompiled in order to effect the desired changes.

What is therefore needed is an object editor capable of editing reflective objects which may be configured to selectively display objects and their attributes without necessitating software recompilation. What is also needed is a method of configuring an adapter to selectively access objects including reflective objects and their attributes without necessitating adapter recompilation.

SUMMARY OF THE INVENTION

In one aspect, an object editor capable of displaying a set of application software objects, which may include objects with a dynamic reflection capability ("reflective objects"), includes an configuration model instance (CMI), a generic adapter, and a UI framework. The CMI is particular to the set of application objects to be edited and defines a particular view of these objects to be provided by the editor. The CMI is external to the generic adapter and includes settings that control which application objects will be visible, which of the visible objects' attributes will be displayed, the arrangement of displayed application objects and attributes, and the appearance of the displayed objects and attributes. The CMI may be stored as an XML or XMI file. The generic adapter reads the CMI's current settings, selectively accesses the set of application objects to be edited and their attributes as dictated by the CMI settings, and passes the accessed information to the UI framework for display. The adapter uses reflection to access the attributes and associations of reflective objects. To access non-reflective application objects, a custom adapter that does not use reflection may be designated. The CMI settings may be changed between editor invocations to cause objects or their attributes to be accessed and displayed differently, or not at all. The editor may be configured to edit a new set of software objects by substituting a new CMI corresponding to that set of objects.

In another aspect, a configurable generic adapter intended for use in an application which may not be an object editor is configurable by way of an external CMI. The CMI is particular to the set of application objects being utilized by the application, which may include reflective objects. The CMI defines a particular manner of navigating the application objects. For reflective application objects, the generic adapter reads the CMI's current settings, selectively accesses the set of application objects and their attributes as dictated by the CMI settings, and passes the accessed information to a client software component for use. The adapter uses reflection to access the attributes and associations of reflective objects. For non-reflective application objects, a custom adapter that does not use reflection may be designated. The CMI settings may be changed between application invocations to cause the application to access the objects differently and thus to behave differently. The CMI may be stored as an XML or XMI file.

In a further aspect of the present invention, there is provided a configuration model for configuring at least one adapter software component to selectively access set of application software objects including at least one reflective application software object, the at least one adapter software component including a generic adapter software component which uses reflection to access reflective application software objects, the configuration model being an object oriented implementation and being external to the at least one adapter software component.

In another aspect of the present invention, there is provided a computer readable medium storing computer software that, when loaded into a computing device, adapts the device to, in an adapter software component, selectively access a reflective application software object by: accessing a configuration model instance (CMI) external to the adapter software component to determine a manner of accessing the reflective application software object; and using reflection to selectively access the reflective application software object in the manner indicated by the CMI.

In yet another aspect of the present invention, there is provided a computer readable medium storing computer software that, when loaded into a computing device, adapts the device to, in an adapter software component, access at least one application software object of a set of application software objects, the at least one application software object having a desired relationship with a specified reflective application software object, by: accessing a configuration model instance (CMI) external to the adapter software component to determine a manner of identifying the at least one application software object that has the desired relationship with the specified reflective application software object; and using reflection to access the at least one application software object identified using the determined manner of identifying.

In another aspect of the present invention, there is provided a method of configuring an adapter software component to selectively access application software objects, including: providing a serialized configuration model instance (CMI) that is external to the adapter software component and is indicative of a desired manner of accessing the application software objects; de-serializing the CMI; and accessing the de-serialized CMI from the adapter software component to determine the desired manner of accessing the application software objects.

In still another aspect of the present invention, there is provided a computer readable medium storing a controller software component for mapping a client software component method to a corresponding method capable returning a desired feature of a reflective application software object, the controller software component including: an adapter software component having a method corresponding to the client software component method, the adapter software component method being configurable to access the desired feature of an application software object using reflection; and a configuration model instance external to the adapter software component for configuring the adapter software component method to selectively access the desired feature of an application software object using reflection.

In yet another aspect of the present invention, there is provided an object editor, including: a user interface framework; a controller software component for mapping at least one method of the user interface framework to a corresponding method capable of returning a desired feature of a reflective application software object, the controller software component including: an adapter software component having a method corresponding to the user interface framework method, the adapter software component method being configurable to access the desired feature of an application software object using reflection; and a configuration model instance external to the adapter software component for configuring the adapter software component method to selectively access the desired feature of an application software object using reflection.

In another aspect of the present invention, there is provided, in an adapter software component, a method of selectively accessing a reflective application software object, including: accessing a configuration model instance (CMI) external to the adapter software component to determine a manner of accessing the reflective application software object; and using reflection to selectively access the reflective application software object in the manner indicated by the CMI.

In yet another aspect of the present invention, there is provided a computing device operable to cause an adapter software component to selectively access a reflective application software object by: accessing a configuration model instance (CMI) external to the adapter software component to determine a manner of accessing the reflective application software object; and using reflection to selectively access the reflective application software object in the manner indicated by the CMI.

In another aspect of the present invention, there is provided, in an adapter software component, a method of accessing at least one application software object of a set of application software objects, the at least one application software object having a desired relationship with a specified reflective application software object, including: accessing a configuration model instance (CMI) external to the adapter software component to determine a manner of identifying the at least one application software object that has the desired relationship with the specified reflective application software object; and using reflection to access the at least one application software object identified using the determined manner of identifying.

In yet another aspect of the present invention, there is provided a computing device operable to cause an adapter software component to access at least one application software object of a set of application software objects, the at least one application software object having a desired relationship with a specified reflective application software object, by: accessing a configuration model instance (CMI) external to the adapter software component to determine a manner of identifying the at least one application software object that has the desired relationship with the specified reflective application software object; and using reflection to access the at least one application software object identified using the determined manner of identifying.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of this invention:

FIG. 6A illustrates a saved OO configuration model instance (CMI) file based on the model of FIG. 5, in extensible Markup Language (XML) format;

FIG. 10 is a UML sequence diagram illustrating object interaction in the system of FIG. 1 during the display of application objects; and FIG. 11 is a CMI file in XML Metadata Interchange (XMI) format which may be used in place of the XML CMI file of FIG. 6A in an alternative embodiment.

DETAILED DESCRIPTION

Figure 1:
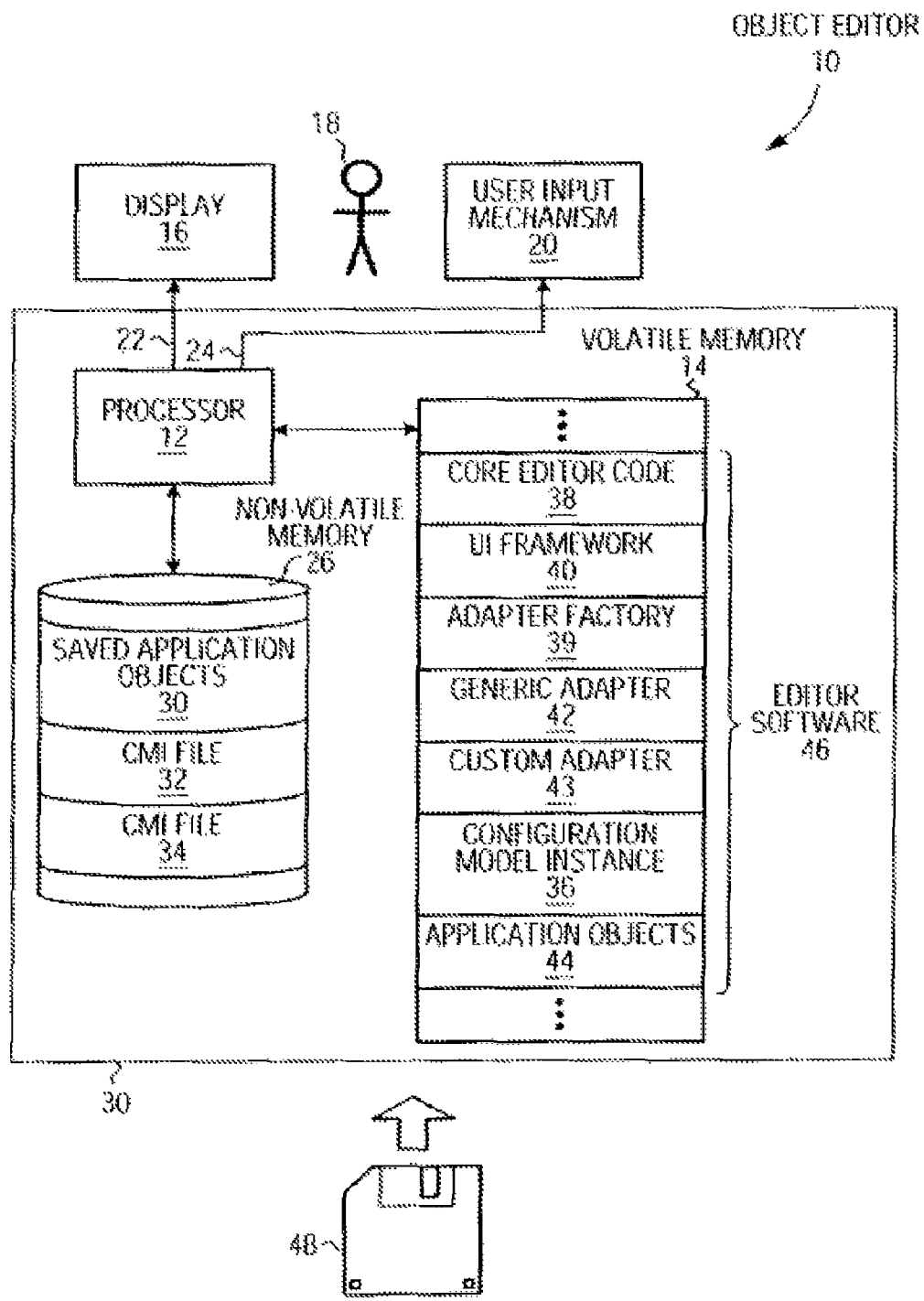
FIG. 1 is a schematic diagram of an object editor exemplary of the present invention.

FIG. 1 illustrates an exemplary object editor 10 capable of editing reflective objects comprising a computing device 30 executing editor software 46 stored in volatile memory 14 (e.g. RAM). The computing device 30, which may be a PC, server or handheld device for example, includes a processor 12 in communication with the volatile memory 14 as well as non-volatile memory 26 (e.g. a hard drive). The interconnections between the volatile and non-volatile memories 14 and 26 and the processor 12 are conventional. A display 16 for displaying a graphical user interface (GUI) to a user 18 and a user input mechanism (UIM) 20 for receiving input from the user 18 are interconnected with the processor 12 by way of links 22 and 24 respectively. The link 22 may not be a direct connection, and may for example include a video card (not shown) in communication with both the processor 12 (by way of a system bus) and a monitor (by way of a standard cable interconnection) in a conventional manner. The interconnection of the UIM 20 with the processor 12 is also conventional and may not be direct.

Display 16 is a conventional display device, such as a CRT, flat-screen monitor or liquid crystal display, capable of presenting a GUI to a user 18. The display 16 may form part of the computing device 30 comprising the computing system 10.

The user input mechanism 20 is a device or devices capable of generating user input representative of commands for operating the object editor 10. The UIM 20 may be a keyboard, mouse or touch screen, for example, or a combination of these devices, and may be capable of controlling a movable pointer on the display 16 for interacting with a GUI. The UIM 20 may form part of the computing device 30 which comprises the editor 10.

The editor software 46 contained in volatile memory 14 facilitates the object editor's display and editing of application software objects which may include reflective objects. As will be described, the software 46 adheres to the Model View Controller (MVC) design paradigm. The software 46 is comprised of six parts: the "core" editor code 38, the UI framework 40, the adapter factory 39, the generic adapter 42, an optional custom adapter 43, and the object oriented configuration model instance (CMI) 36. These parts will be described below in the context of the software component description of FIG. 2. The object editor software 46 may be loaded into the volatile memory 14 of the editor 10 from any suitable computer readable medium, such as a removable optical or magnetic disk 48, or from resident non-volatile memory 26 such as a hard drive or a read only memory chip.

Volatile memory 14 also comprises a set of application software objects 44 to be edited. The application objects 44 are interrelated in accordance with an operative application object model (described below) pertaining to a particular application. In the present embodiment, the exemplary application to which the objects pertain is a banking application. The objects 44 are instantiated from Java™ classes that are created by way of one or more software or tools which input the above referenced banking model and generate corresponding OOPL code. The objects 44 of the present embodiment are all MOF compliant and thus possess a dynamic reflection capability (i.e. they are reflective). The manner in which the objects 44 are made MOF compliant in the present embodiment is by way of their inheritance of MOF implementation classes from a MOF package implemented in the Java™ OOPL. The MOF package upon which the MOF objects 44 depend follows OMG's MOF standard version 1.3. The associated specification is set forth at ftp://ftp.omg.org/pub/docs/formal/01-11-02.pdf. The generation of such MOF compliant OOPL code may be facilitated using tools such as the MOF Add-In to the Rational Rose® Model Editor. Alternatively, the software objects 44 may be implemented manually without the use of the described software tools.

Non-volatile memory 26 contains a file 30 comprising a saved representation of the application objects 44 to be edited. In the present embodiment, the file 30 is a serialized XML representation of the banking objects comprising the set of objects 44. As known to those skilled in the art, XML is a meta language which allows users to define application-specific information formats. For further background information regarding XML, the reader is referred to the text *XML Applications* by Frank Boumphrey et al., 1998, Wrox Press.

As will be appreciated, the saved application objects file 30 is initially read (de-serialized) by the editor 10 in order to instantiate the objects 44 prior to their display by the editor 10. Thereafter, upon the completion of editing, the objects may be saved (serialized) back to the file 30, possibly with updated data values. The serialization of objects 44 to an XML file such as file 30 is in accordance with the metadata interchange as defined in section 2.4.3 of the above-referenced MOE specification.

Non-volatile memory 26 further includes two versions 32, 34 of a configuration model instance file comprising saved (serialized) representations of a CMI 36. These files, are also XML in the present embodiment and may be serialized in the same manner as the saved objects file 30. Each CMI file 32, 34 may be thought of as a "plug-in" to the object editor 10 which dictates the operative "view" of the application objects 44 to be edited (i.e. which objects/attributes will be visible, how the objects will be arranged, etc.). It should be appreciated that CMI files are particular to the set of application objects to be edited. Here, each of the CMI files 32, 34 pertains to the banking-related application objects 44, and each provides an alternative view of the same set of application objects 44. The CMI files may be prepared by a system configurator based on an understanding of the application software objects to be displayed, the underlying motivation or purpose for the editing of the objects 44, and the operative configuration model (to be described). The view of the edited objects 44 may be changed between editor invocations by configuring the editor 10 to instantiate a different one of CMI files 32 and 34 than was previously used. It will be appreciated that additional CMI files defining further alternative views of the objects 44 may exist in non-volatile memory 26.

Figure 2:
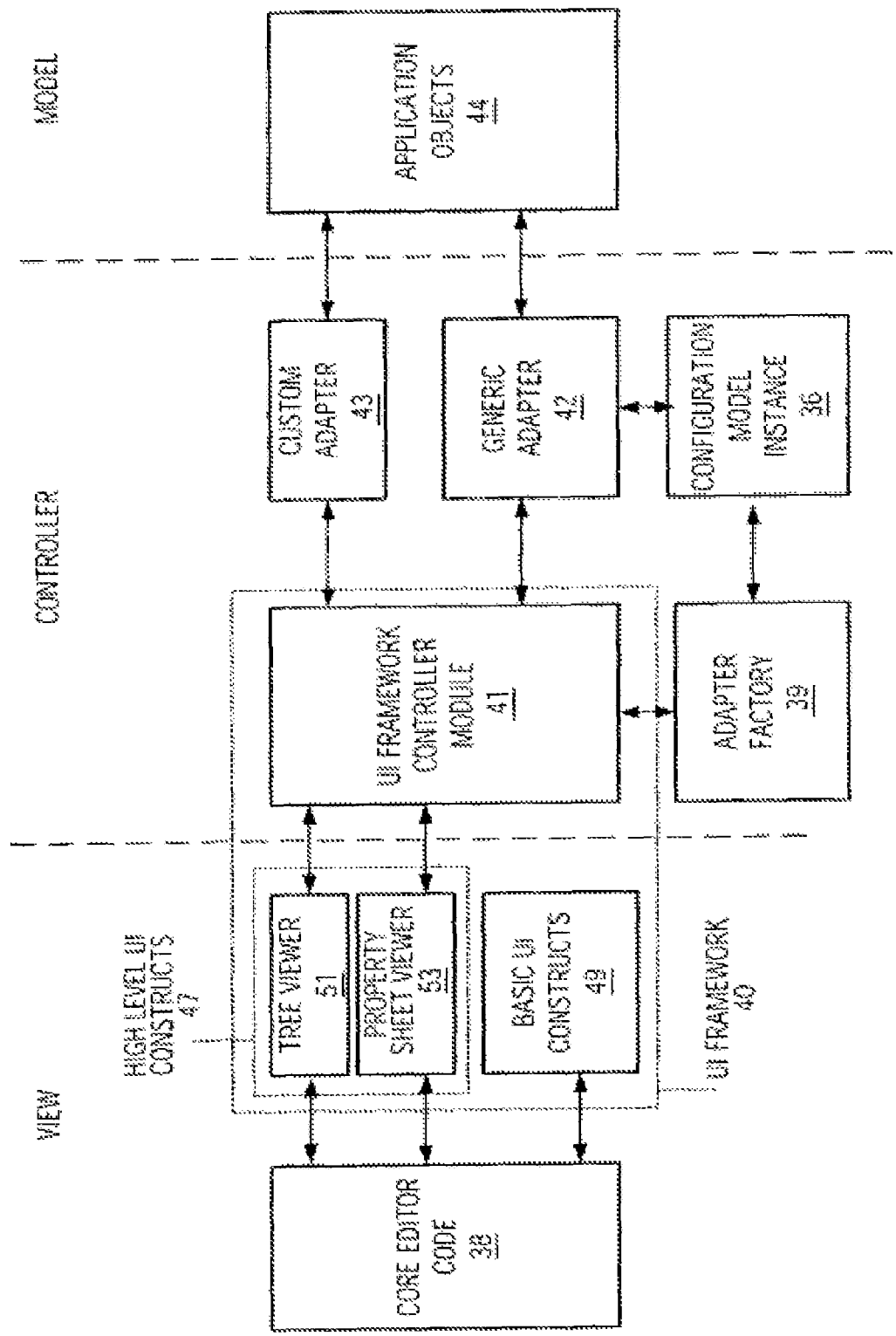
FIG. 2 is a schematic diagram illustrating data flow between software components of the editor of FIG. 1.

FIG. 2 is a schematic diagram illustrating the various software components of the object editor 10 of FIG. 1 and their roles within the object editor 10. The arrows of FIG. 2 illustrate data flow. As noted, the object editor 10 follows the MVC paradigm, which is described generally in G. E. Krasner and S. T. Pope, *A Cookbook For Using the Model View Controller User Interface Paradigm in Smalltalk-80*, Journal of Object Oriented Programming, 1(3): 26-49, August-September 1988.

As illustrated in FIG. 2, the "View" component of the object editor 10, which provides the editor 10 with its user interface, includes the core editor code 38, higher level UI framework constructs 47, and basic UI framework constructs 49.

The core editor code 38 comprises executable software code which serves as the "main program" of the object editor 10. The core editor code 38 implements basic editor capabilities such as loading (i.e. reading from file 30 and de-serializing) a set of application objects 44 to be edited and saving the edited objects back to file 30. The code 38 further determines the general type of view (e.g. tree, table, etc.) that is to be provided of the application objects 44. The core editor code 38 may be implemented by a software developer familiar with the editing task to be performed, using an OOPL such as Java™ for example. The core editor code 38 utilizes and interacts with basic UI framework constructs 49 as well as high level UT framework constructs 47 to achieve these goals.

The basic UT constructs 49 provide fundamental tools for implementing a GUI. These may include menus, button, or window objects, application programming interfaces (APIs) for common operating system interactions (e.g. accessing files from secondary memory), and the like. The basic UI constructs 49 are utilized by the core editor code 38 to implement basic editor capabilities.

The higher level UT constructs 47 facilitate the display of sets of objects of any type (or sets thereof) in certain commonly utilized display formats. For example, the constructs 47 include a "tree viewer" construct 51 which permits a set of related objects of any type to be displayed in the form of a tree. The constructs 47 further include a "property sheet viewer" construct 53 which permits a property sheet for a selected application software object to be displayed. Further constructs, such as a "table viewer" construct which permits the display of object sets in table form, may be included in the constructs 47 despite not being illustrated. It should be appreciated that the tree viewer 51 and property sheet viewer 53 are illustrative and may have different names in different UT frameworks 40. As well, different UT frameworks 40 may comprise different sets of high level constructs. The high level constructs 47 are utilized by the core editor code 38 to implement the general type of view (e.g. tree or table) that is to be provided of the application objects 44.

The "Controller" component of the object editor 10, which is responsible for mapping the "Model" component to the user interface provided by the "View" component, includes the UT framework controller module 41, the adapter factory 39, the generic adapter 42, the optional custom adapter 43, and the configuration model instance 36.

The UI framework controller module 41 is provided by the UI framework 40 to support the display of objects by the high level UI framework constructs 47. The controller module 41 maps "generic" display-related methods of the UI framework 40 (e.g. getChildren or getParent) invoked from within the high level constructs 47 (e.g. the tree viewer construct 51) to adapter methods which retrieve the desired objects/attributes of the application objects 44, to permit the generic methods to provide the desired view of the objects 44. The controller module 41 interacts with the adapter factory 39 for the purpose of identifying the appropriate adapter to use for a particular class of application objects 44, and with the generic adapter 42 or the custom adapter 43 (whichever is returned by the adapter factory 39 for a particular object) to retrieve desired application object data. The controller module 41 is edited by a software developer to provide the functionality described herein. It should be recognized that, despite being part of the UT framework 40, the controller module 41 is considered to be part of the "Controller" component of the object editor 10 (as shown in FIG. 2), and not the "View" component, as it serves a "Controller" function.

As shown in FIG. 2, the higher level UT framework constructs 47, basic UI framework constructs 49, and UI framework controller module 41 cumulatively comprise the UI framework 40; this framework 40 may comprise a known object oriented UI framework, such as the Java™ Foundation Class Swing components from SUN® Microsystems.

The adapter factory 39 is a software component which is responsible for identifying and returning the appropriate adapter to be used for a particular class of application software object 44. It may thus be helpful to conceive of the adapter factory 39 as an "adapter selector". Upon being invoked by the controller module 41, the adapter factory 39 interacts with the CMI 36 in order to determine which adapter is appropriate for the application object class in question. The identified adapter may be either the generic adapter 42 or a custom adapter 43. The identified adapter is returned to the UI framework controller module 41.

The generic adapter 42 is a software component which maps the generic methods of the UI framework controller module 41 to routines which provide a logically analogous function for the software application objects 44 to be edited so as to effect the desired view. The adapter 42 interacts with the CMI 36 to determine the appropriate mapping for a particular application object class. The adapter 42 is referred to as "generic" because it utilizes reflection to access attributes and associations of any reflective objects being edited, and thus does not include any specific references to attributes or associations that are particular to a displayed application object type. The generic adapter 42 is accordingly used only for reflective (here, MOF compliant) objects.

The custom adapter 43 is an optional software component which provides, for a particular class of application objects, a specialized mapping between the above noted generic UI controller module 41 methods and specific application object methods of that class which effect the desired view. Custom adapters may be used in cases when an application object class is not reflective (such that the generic method's use of reflection would not be supported) or because a customized adapter behavior outside the scope of the generic adapter's functionality is desired for a particular class of application objects. The custom adapter 43 does not interact with the CMI 36, as its "settings" are hard coded. It should be appreciated that the custom adapter 43 is specific to a particular application object class; thus, in the case when custom adapter behavior is desired for multiple application object classes, multiple custom adapters 43 may be provided.

Configuration model instance 36 is a set of software objects which comprise the "settings" that control the manner in which the application objects being edited by the object editor 10 are accessed and displayed. The CMI 36 is external to the generic adapter 42, i.e. it is separate from the code which implements the generic adapter 42. As a result, the CMI permits configuration of the generic adapter 42 without generic adapter recompilation. In the case of object editor 10, the CMI 36 controls which objects will be visible, which of the visible objects' attributes will be displayed, the arrangement of displayed objects and attributes, and the appearance of the displayed objects and attributes. The CMI 36 achieves this in part by controlling which adapters are to be used for a particular application object class; more generally, the CMI 36 achieves this by controlling which objects and attributes of the set of application objects being edited will be accessed by the adapter 42, and in what order. As will subsequently be described in more detail in conjunction with FIG. 5, the "settings" of the CMI 36 take the form of instances of various object oriented classes defined in the operative configuration model, which instances represent different aspects of a "view" of the application objects to be edited. The CMI 36 is instantiated from set of OOPL (e.g. Java™) classes which implement this operative configuration model. The CMI 36 is created through de-serialization of a CMI file 32 or 34.

Figure 3:
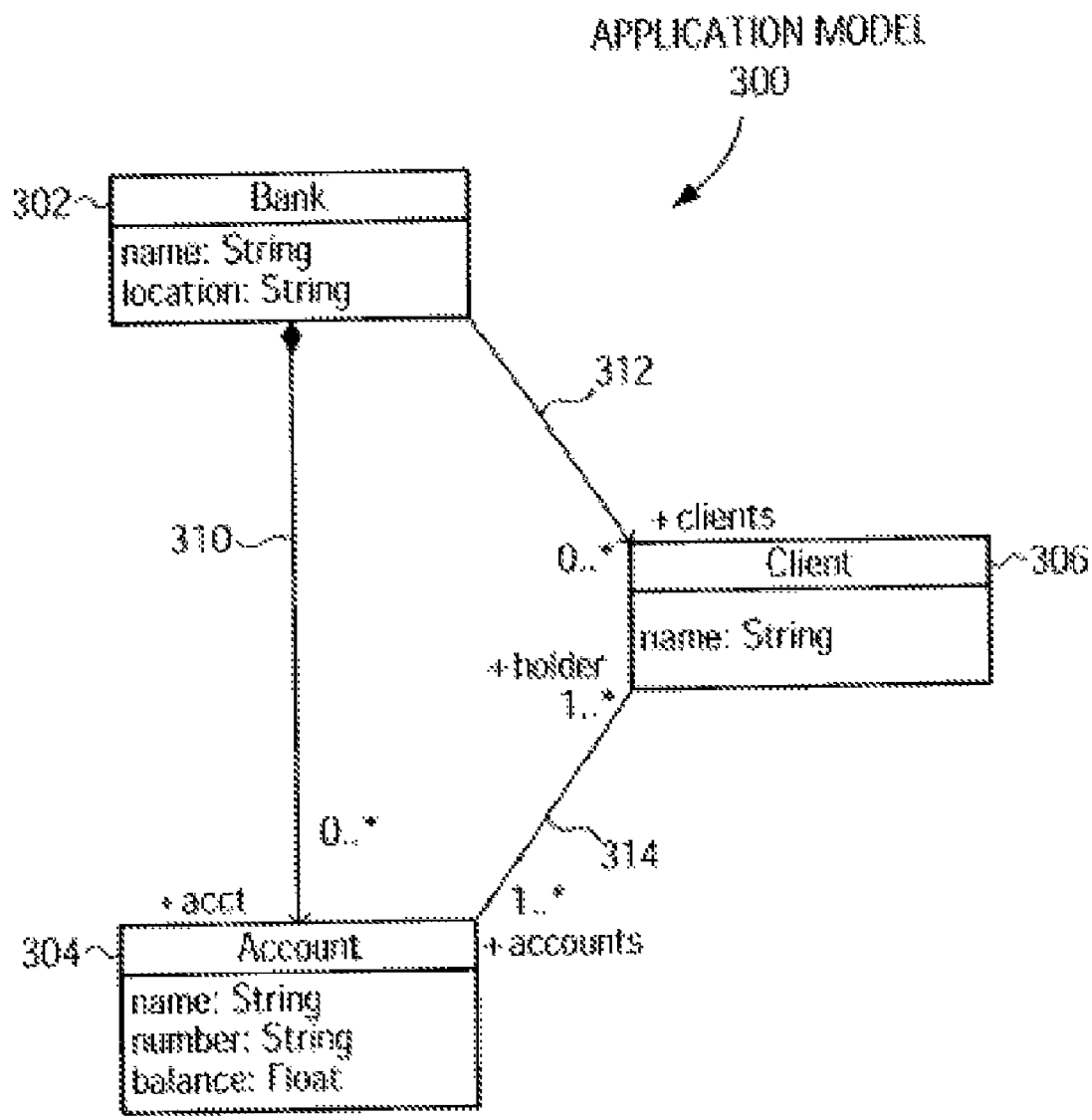
FIG. 3 illustrates, in UML notation, an exemplary banking application model for software objects which may be edited by the editor of FIG. 1.

FIG. 3 comprises a UML representation of a simple object oriented banking model 300 for banking related objects which may be edited by the object editor 10. The model 300 is referred to as the "governing application model" as it is the model upon which the application objects 44 to be edited are based. It will be appreciated that a fundamental understanding of UML is necessary in order to best comprehend the UML model 300. This understanding may be facilitated by reference to the text by M. Fowler and K. Scott entitled UML Distilled: *A Brief Guide to the Standard Object Modeling Language*, 2nd ed., Addison-Wesley, 2000.

As illustrated, the banking model 300 comprises three concrete object classes, namely, a Bank class 302, an Account class 304, and a Client class 306, representative of a bank branch, a bank account, and a bank client, respectively. As will be apparent to those skilled in the art, the containment relationship 310 between the Bank class 302 and the Account class 304 reflects the fact that multiple accounts may be associated with a bank branch instance. Similarly, the unidirectional association 312 between the Bank class 302 and the Client class 304 reflects the fact that multiple clients may also be associated with a bank branch instance. A bi-directional association 314 between the Account and Client classes 304 and 306 indicates that Account objects and Client objects are each able to access one another by way of the "holder" and "accounts" associations, respectively. The indicated cardinalities ("1 . . . *") indicate that an account may have more than one holder and that a client may have more than one account.

The Bank class 302 includes a name field representative of the bank name and a location field representative of the bank branch location. The Account class 304 includes a name attribute reflecting the account name (e.g. "Savings" or "Chequing"), a number attribute indicative of a unique bank account number, and a balance attribute representing the account balance in dollars. The Client class 306 includes only a name attribute representing a client name.

Figure 4:
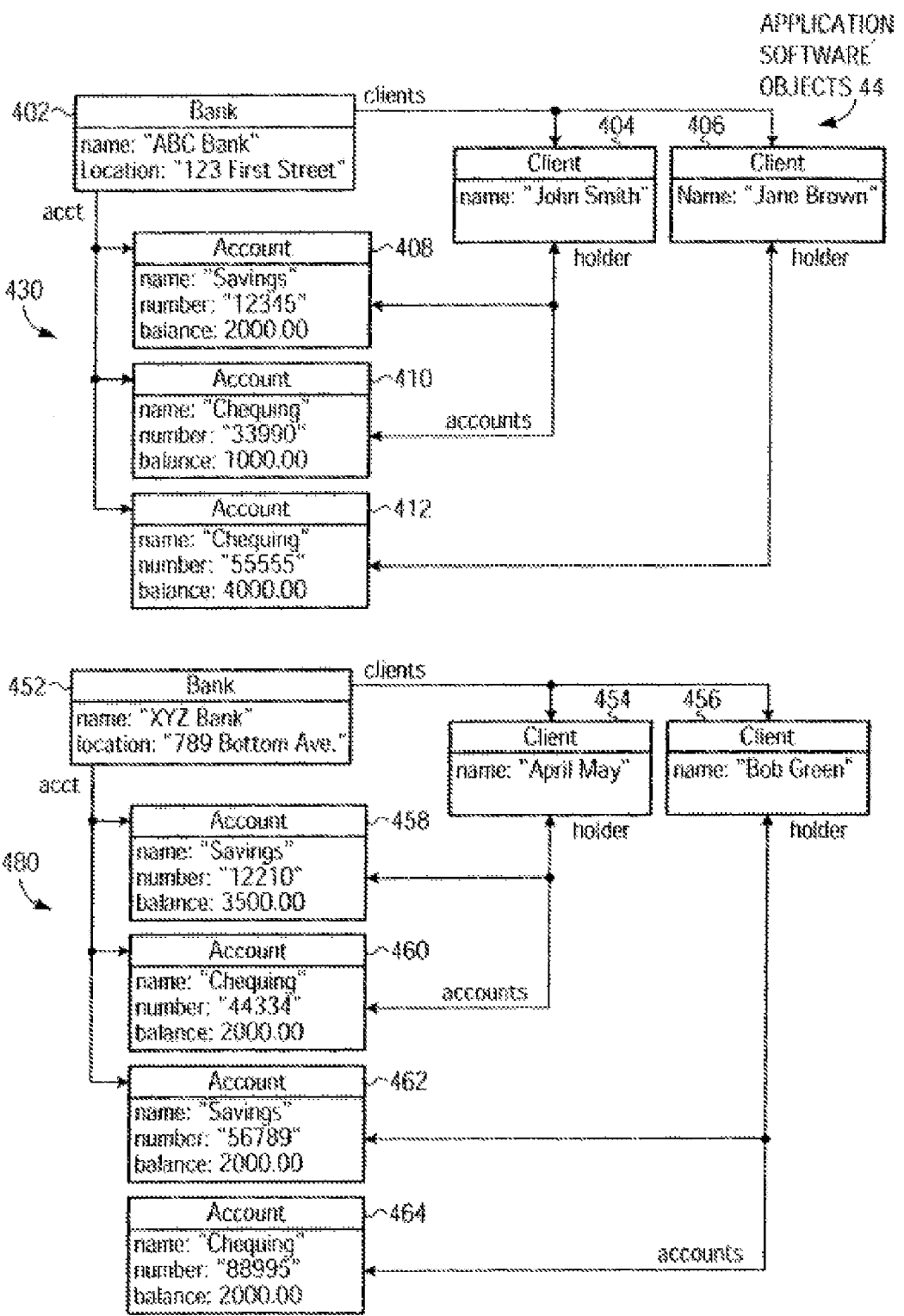
FIG. 4 illustrates an exemplary set of instantiated application objects based on the banking model of FIG. 3 which may be displayed or edited by the editor of FIG. 1.

FIG. 4 illustrates in greater detail the set of application software objects 44 stored in volatile memory 14 (FIG. 1) which comprise the "Model" component of the object editor 10. As understood by those skilled in the art, the boxes of FIG. 4 represent objects that have been instantiated from OOPL (e.g. Java™) classes implementing the classes defined in the banking model 300 (FIG. 3). The upper portion of each object box contains the name of the class from which the object was instantiated, while the lower portion may contain the value of the object's attributes. Interconnecting arrows in FIG. 4 represent interrelationships between objects which comprise instantiations of the various associations 310, 312 and 314 defined in banking model 300.

Referring now in more detail to FIG. 4, the application objects 44 comprise a first group 430 and a second group 480. Each group is logically associated with a single bank branch and thus includes a single Bank object, and contains no associations to any object of the other group.

The first group of objects 430 represents a branch of the bank "ABC Bank" located at 123 First Street, which has two clients and three accounts. Accordingly, the group 430 comprises a Bank object 402, two Client objects 404, 406, and three Account objects 408, 410, and 412. In Bank object 402, the value "ABC Bank" of the name attribute reflects the bank's name, and the value "123 First Street" of the location attribute reflects the branch location. With respect to the Client objects 404 and 406, the value of their name attributes represents the client's names. Similarly, the Account objects 408, 410, and 412 are each populated with values in their name, number and balance attributes to represent client accounts.

The second group of objects 480, which includes a bank object 452, two client objects 454, 456 and four account objects 458, 460, 462 and 464, is representative of a different branch of another bank "XYZ Bank", and is analogous in its composition to the first group.

It should be appreciated that the set of software objects 44 could comprise a greater or lesser number of Bank objects, Client objects and Account objects.

Each object 402, 404, 406, 408, 410, 412, 452, 454, 456, 458, 460, 462 and 464 in the set of software objects 44 of the present embodiment is MOF compliant thus include the MOF capability of reflection. This is not required however; non-MOF compliant application objects may be included in the set of objects 44.

Figure 5:
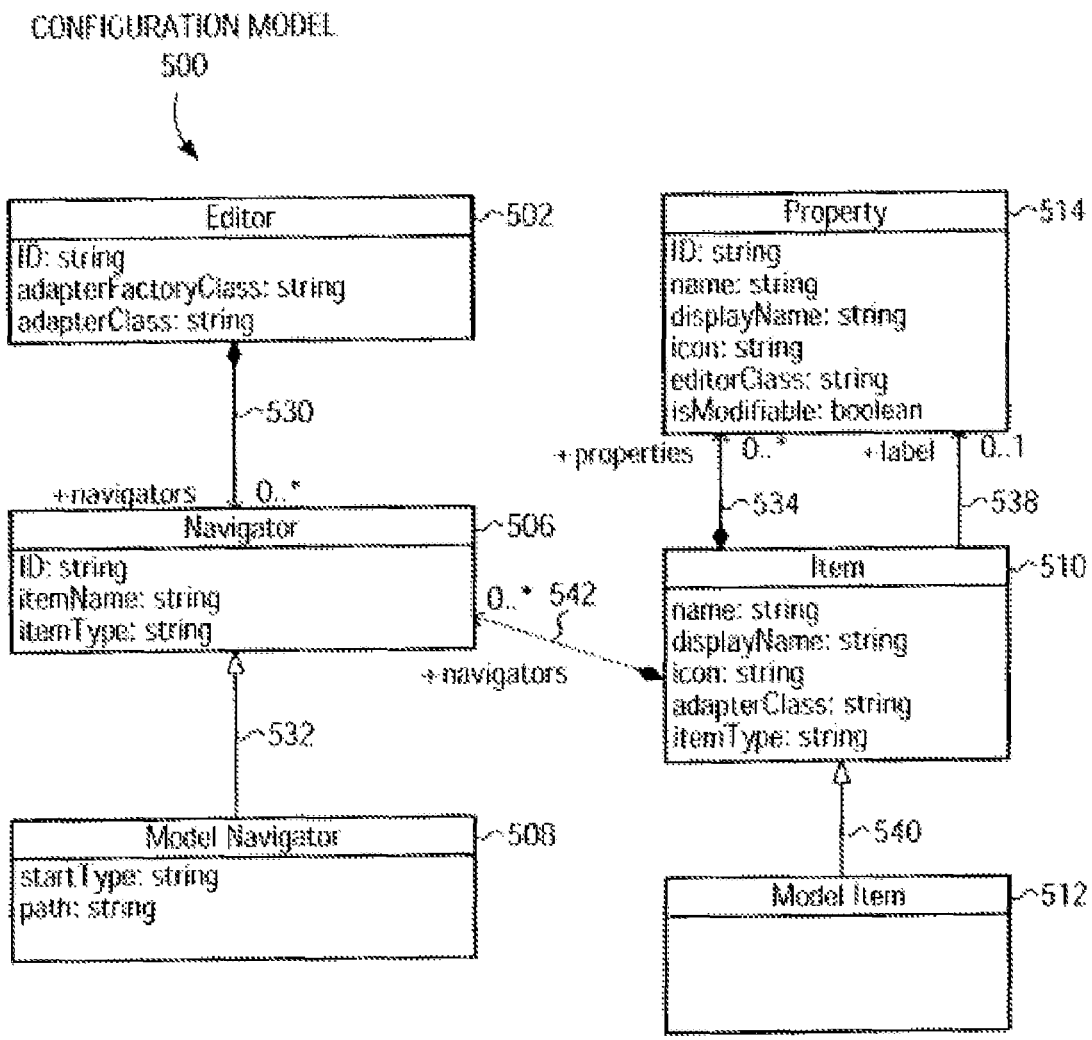
FIG. 5 illustrates, in UML notation, an object oriented (OO) configuration model, instances of which may be used to configure the editor of FIG. 1.

FIG. 5 is a UML representation of the object oriented configuration model 500 used in conjunction with the present embodiment. The configuration model 500 is the model upon which the configuration model instance 36, described above, is based. The objects and attributes of the model 500 constitute the CMI "settings" which, when instantiated with appropriate values for the set of objects 44, control the view of objects 44 in the object editor 10. The configuration model 500 may be implemented in an OOPL such as Java™. The configuration model 500 comprises six concrete classes, namely, an Editor class 502, a Navigator class 506, a Model Navigator class 508, an Item class 510, a Model Item class 512 and a Property class 514, which will now be described. It will be appreciated that additional object classes and attributes beyond those illustrated in FIG. 5 may be included in alternative embodiments.

Editor class 502 is representative of editor-level configuration settings which govern the manner in which application objects 44 are accessed. The ID attribute is a unique identifier associated with a particular editor. The adapterFactoryClass identifies the adapter factory 39 to be used for the present embodiment. The adapterclass attribute, on the other hand, identifies a generic adapter to be used for the instant editor invocation. This may reference an alternative generic adapters to the default generic adapter 42, e.g. it if is desired to customize the view of a set of application objects 44 in a manner that is not contemplated in the default generic adapter 42.

Navigator class 506 represents the accessing of, or "navigation to", a particular class of non-reflective (here, non-MOF) objects in the set of objects 44 by the adapter 42 during the course of the editor's display of the software objects 44. Only the non-MOF object classes that are referenced in an instance of the Navigator class 506 (in particular, in its "name" attribute) will be accessed or "navigated to" during display of the set of software objects 44 and can thus be made visible by the object editor 10. It will be appreciated that Navigator objects represent accesses to non-reflective objects only; accesses to reflective objects are represented by instances of the Model Navigator class 508, described below.

A Navigator object may be contained by either an Editor object (by way of composition relationship 530) or an Item object (by way of composition relationship 542). When contained by an Editor object, the Navigator object represents the accessing of a class of objects from the "root" level of the set of objects 44. When contained by an Item object (described below), the Navigator object represents the accessing of a class of objects from the vantage point of a particular "originating" class in the governing application model 300, which class is identified by the containing Item object. The Navigator class' ID attribute represents a unique identifier of an instance of Navigator class 506.

The itemName and itemType attributes cumulatively provide flexibility for the provision of alternative views within a single configuration model instance 36. These attributes are used to access a custom adapter for use with a class of application objects 44 when a particular class of application objects 44 are to constitute children of the former class of objects in the desired view. The itemName attribute represents the class name of an application software object existing in the application model 300 that is to be "navigated to" during the display of objects 44. The itemType attribute identifies a the custom adapter to be used. These two attributes are considered to be an advanced feature of the configuration model and may not be necessary if it is desired to view all reflective objects of the set of application objects 44 uniformly.

Model Navigator class 508 represents reflective object accesses (to be distinguished from non-reflective object accesses, which are represented by the Navigator class 506) that shall be performed by the adapter 42 during the display of application objects 44. As reflected by the inheritance relationship 532, Model Navigator class 508 is a subclass of Navigator class 506. Only the reflective object classes that are referenced in a ModelNavigator object will be accessed or "navigated to" during the display of software objects 44 and can thus be made visible by the object editor 10.

The startType attribute and the path attribute of class 508 represent two mechanisms for accessing objects within object set 44 from the current "vantage point" in the set 44. The startType attribute represents the name of a MOF object class to be accessed which exists at the "root level" of the governing application model 300 (i.e. it is not contained by another application model class). For example, the Bank class 302 and Client class 306 of the present embodiment are considered to exist at the root level of the model 300 and may thus be referenced by the startType attribute. The startType attribute is commonly used to access root level application objects 44 for display at the highest "root" level of a tree or table view.

The path attribute, on the other hand, represents a "relative" object association or sequence of object associations from a current or "originating" application object class to another application object class. The path attribute is commonly used to determine which objects within the set of application objects 44 are to be considered the "children" of an application object of a particular class of the governing application model 300. The value of the path attribute is equivalent to a rolename (e.g. "acct" in FIG. 3) or sequence of rolenames (e.g. "clients/accounts" in FIG. 3) which leads from the current/originating application model class to another application model class that is to be considered the former model class' child for the purposes of the instant view.

Item class 510 is representative of a particular non-MOF object class existing in the governing application model 300 which will, by virtue of an instance of the Navigator class in the CMI 36, be accessed during the course of the editor's display of the application objects 44. For each class of non-MOF objects that will be accessed by virtue of a Navigator object in the CMI 36, an instance of the Item class 510 should exist in the CMI 36 to indicate (among other things) how the object, once "navigated to", should appear when displayed.

The name attribute of class 510 represents the class name of the non-MOF object class in the governing application model 300. The displayName attribute represents a fixed text string or "label" that is displayed in conjunction with each iconic instance of the class identified by the "name" attribute when the instance is displayed by the object editor 10. Assuming that descriptive class names have been selected for the classes of the governing model 300, the displayName attribute will typically match the value of the name attribute; however this is not required. The Icon attribute is a path to an icon file (e.g. "icon.gif" or "/graphics/icon.jpg") which shall be displayed by object editor 10 to represent each instance of the object class represented by the Item object in the set of application objects 44. The adapterClass attribute represents a custom adapter to be used for objects of the identified class. This attribute permits the generic adapter 42 to be "overridden" with a custom adapter 43 for a particular class of objects defined in the application object model 300. It should be appreciated that such specification of a custom adapter is required for non-reflective application objects, as a non-reflective application object is incapable of being accessed by way of the default generic adapter 42 due to the generic adapter's use of reflection. The type attribute is analogous to the itemType attribute of the Navigator class 506.

Model Item class 512 represents a particular reflective object class (to be distinguished from non-reflective object classes, which are represented Item class 510) existing in the governing application model 300 that will, by virtue of an instance of the ModelNavigator class in the CMI 36, be accessed during the course of the editor's display of objects 44. As reflected by the inheritance relationship 540, the Model Item class 512 is a subclass of Item class 510. For each class of reflective objects that will be accessed by virtue of a Model Navigator object 508 in the CMI 36, an instance of the Model Item class 512 should exist in the CMI 36 to indicate how the reflective object, once "navigated to", should appear when displayed. The Model Item class 512 of the present embodiment includes no additional attributes beyond those inherited from the Item class 510.

Property class 514 is representative of an attribute of an application object class (whether reflective or not) contained within the governing application model 300 that may be made visible as a "Property" of the displayed application object instance during the course of the editor's display of the objects 44 (either in a main display area or a properties sheet, as will be described). It should be appreciated that, without a corresponding Property object in the CMI 36, an attribute of a displayed application object class defined in the governing application model 300 will not be displayed. A Property object may be contained by an Item object by way of an instance of the composition relationship 534; this relationship associates the attribute represented by the Property object with the containing class of the governing application model 300.

The ID attribute of the Property class 514 is a unique identifier that is assigned to each Property object and is used for uniquely referencing a particular Property object. The name attribute is indicative of the application object attribute name that the Property object represents. The displayName attribute represents a fixed text string comprising a "label" that is displayed in conjunction the attribute when the attribute is displayed by the object editor 10 within a property sheet (described below). As with the displayName attribute of Item class 510, the displayName attribute of the Property class 514 will typically match the value of the name attribute, but this is not required. The Icon attribute is a path to an icon file which is displayed by object editor 10 to represent each instance of this attribute when it is displayed in a property sheet by the editor 10.

The editorClass attribute optionally identifies an editor which is to be used to edit the current attribute, within a property sheet entry or line item for example. It may be desired to specify a separate editor using the editorClass attribute when the attribute represented by a particular Property object is of a complex type which requires special processing in order to be displayed/edited. Finally, the is Modifiable attribute is a boolean value which reflects whether the represented attribute's value may be changed by the user 18 of the object editor 10.

As reflected by the cardinality "0 . . . *" of the "properties" composition relationship 534, an Item object may contain zero or more properties. As will be appreciated, the set of properties that is contained by the Item is determinative of the set of attributes that will be displayed in the property sheet of an instance of the application object class represented by the Item. Moreover, the ordering of the Property instances within the Item will determine the order of the displayed attributes in the displayed property sheet. Finally, it should be recognized that a property instance may be defined outside of an Item; in this case, the associated attribute will not appear in the property sheet, but it may be displayed by way of the "label" association, which is described next.

A uni-directional "label" association 538 extends from the Item class 510 to the Property class 514 in the configuration model 500. This association permits one property from a set of properties defined in conjunction with a Item to be chosen for display whenever an instance of the object class represented by the Item is displayed. The cardinality of the association 538 is "0 . . . 1" to reflect that the label association is optional and may at most result in the display of a single property, i.e. a single attribute of a displayed object. The application object attribute associated with the property identified by the label association will be displayed by the editor 10 in association with each displayed instance of that application object. For example, by setting the "label" association to reference a defined Property object which pertains to the Bank object's "location" attribute, for each Bank branch icon displayed by the editor 10, the value of the corresponding object's "location" attribute will be displayed, providing the location of that particular Bank object instance; alternatively, by setting the "label" association to point to a different defined Property object which pertains to the Bank object's "name" attribute, for each displayed Bank branch icon, the value of the corresponding object's "ame" attribute will be displayed, indicating the bank name.

The OO configuration model 500 further defines a number of routines (not illustrated) which simplify access to and utilization of the information stored within an instance of a configuration model. These routines are used as APIs for accessing a CMI 36. Included in these routines are a getRootObjects( ) method, a getAdapter( ) method, a getNavigators( ) method, and getProperties( ) method. Other comparable routines may be provided.

The getRootObjects( ) method takes as an input parameter a set of instantiated application objects 44 and returns the objects from the set which should, based on the settings of the CMI 36, be considered to be the root objects for the present view. To achieve this result, the getRootObjects( ) method accesses the startType attribute (and, optionally, path attribute) of the Navigator object contained by the Editor object of the operative CMI 36, and then uses the values of these attributes to ascertain the application model class that should act as the root of the display tree. This information is then used to access and return the objects of the application object set 44 which are of this class.

The getAdapter( ) method takes as an input parameter a particular object of the set of application objects 44 and returns the adapter to be used in association with that object. To achieve this result, the getAdapter( ) method examines the Item objects (including Model Item objects) of the CMI 36 until one is identified with a "name" attribute value which is an instance of the input object parameter's class. The adapterClass attribute of the identified Item is then examined. If a non-null value exists, the identified custom adapter 43 is instantiated and returned. If the value is null, the adapterclass attribute of the Editor object is examined next. If a non-null value exists, the identified non-default generic adapter is instantiated and returned. If the value is null, the default adapter class 42 is instantiated if necessary and returned.

The getNavigators( ) method takes as an input parameter a particular application object and returns the Navigator object to be used in association with that application object. To achieve this result, the getNavigators( ) method examines the Item/Model Item objects of the CMI 36 until one is identified with a "name" attribute value which is the name of the class of the input application object or the name of a class which is a parent of that object. The navigator object(s) associated with the identified Model Item/Model Item is/are then returned.

The getProperties( ) method takes as an input parameter a particular object of the set of application objects 44 and returns the Properties objects associated with that object. Its function is similar to that of the getNavigator(s) method described above.

Figure 7A:
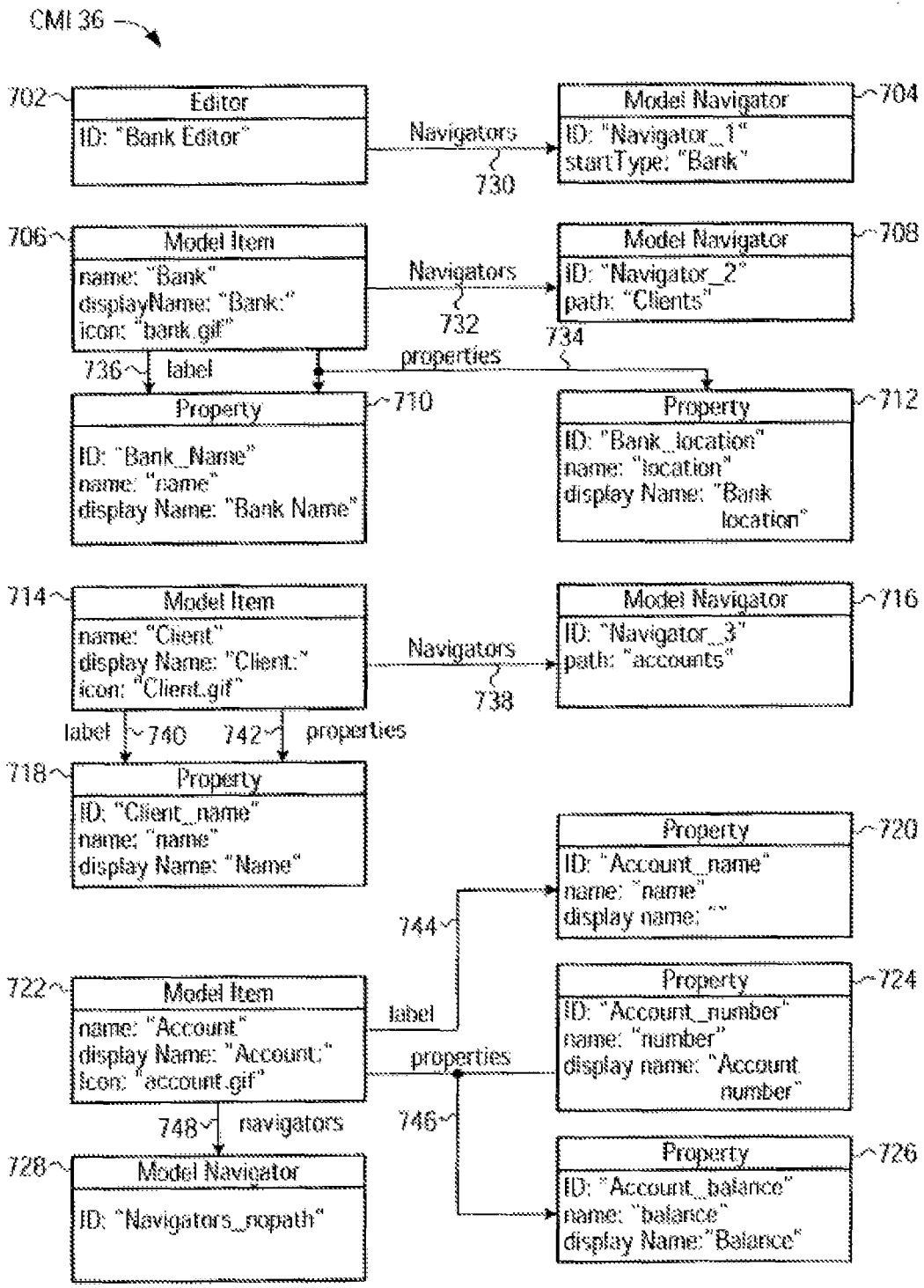
FIG. 7A illustrates an instantiated CMI based on the CMI file of FIG. 6A which may be used to configure the editor of FIG. 1 to display the objects of FIG. 4 according to a particular view.
Figure 8A:
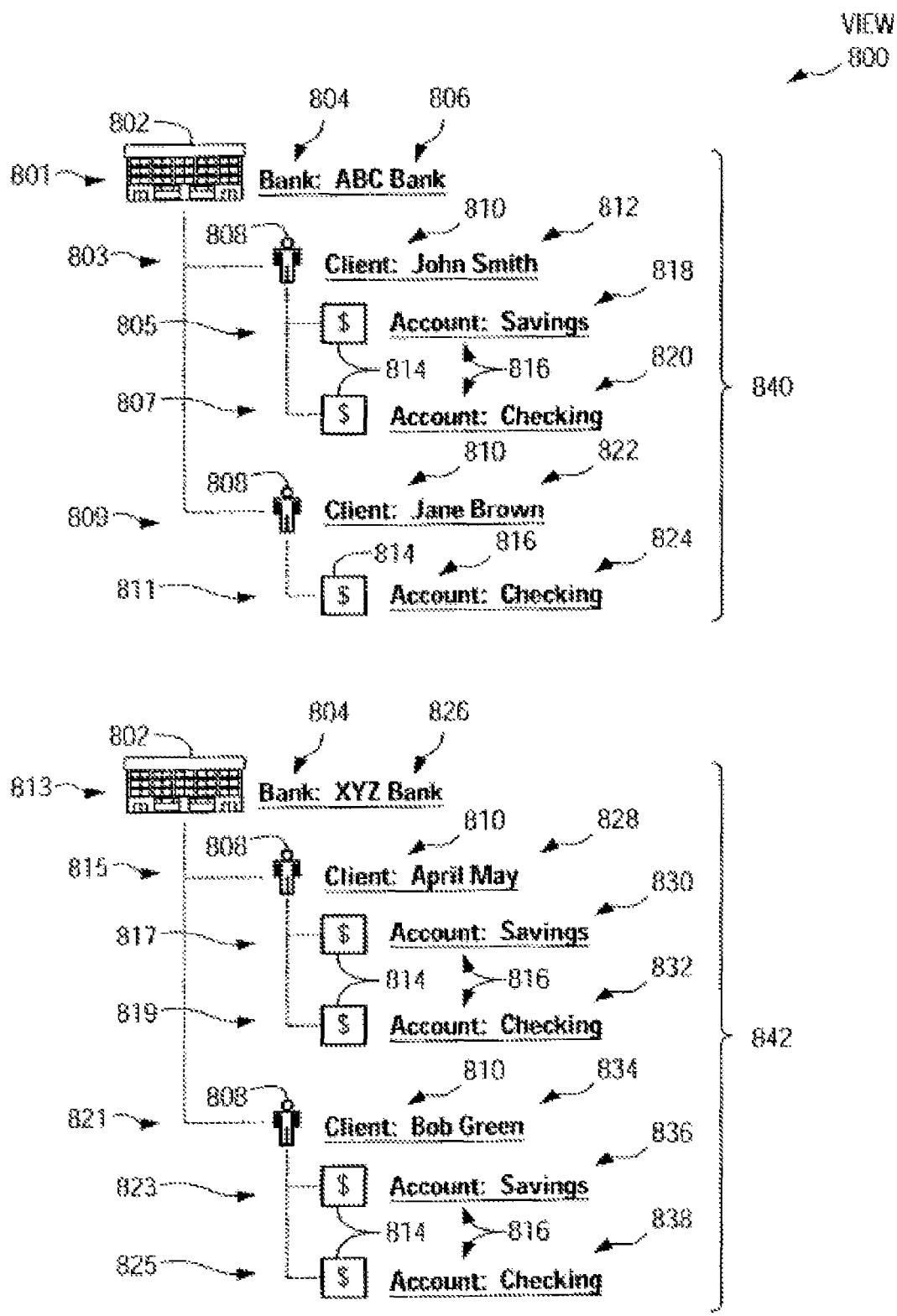
FIG. 8A illustrates the display of the objects of FIG. 4 by the editor of FIG. 1 when configured with the CMI of FIG. 7A.

FIG. 6A illustrates the contents of the CMI file 32 stored in non-volatile memory 26 (FIG. 1). As noted, the CMI file 32 is an ASCII file comprising an XML data instance which defines a particular "view" of the software objects 44. FIG. 6A is best viewed in conjunction with FIGS. 7A and 8A. FIG. 7A illustrates the corresponding CMI 36 that results when the CMI file 32 of FIG. 6A is de-serialized. FIG. 8A illustrates the corresponding generated view 800 of the application objects 44 (FIG. 4) on the display 16 of the object editor 10 when the de-serialized CMI file 32 is used in conjunction with the adapter 42 of the present embodiment. As may be seen in FIG. 8A, the view 800 of the application objects of the present embodiment is in the form of a tree resembling the display of files and directories in a file management utility of a computer operating system.

CMI file 32 includes declarations for a single Editor object (lines 1-3 of FIG. 6A) and three Model Item objects (lines 5-12, 14-19, and 21-28). These declarations correspond with the Editor object 702 and Model Item objects 706, 714, and 722 (respectively) of FIG. 7A.

The Editor object declaration contains a nested Model Navigator object declaration (at line 2 of FIG. 6A) which corresponds to the Model Navigator object 704 of FIG. 7A. This Model Navigator object has a startType attribute with a value "Bank". This value of the Model Navigator object's startType attribute indicates that, for the purposes of the present view, application objects 44 of the class "Bank" are to be considered the "root" objects. This means that, in a tree display of the application objects 44, Bank objects will be displayed at the highest level, as shown in the corresponding display view 800 of FIG. 8A (see, e.g., displayed Bank object instances 801 and 813, whose leftmost positioning in the tree structure indicates a root position in the tree).

The first Model Item declaration (at lines 5-12 of FIG. 6A) determines all aspects of the display of Bank object instances on the display 16 for the present view. For example, the icon attribute (at line 5) indicates that the icon to be displayed in association with each displayed Bank object instance 801, 813 (FIG. 8A) is the icon 802, which is stored in the file "bank.gif". As well, the displayName attribute indicates that the text "Bank:" 804 is to be displayed in conjunction with each displayed Bank object instance 801, 813.

The first Model Item declaration includes nested declarations for a Model Navigator object (at line 7), which corresponds to the Model Navigator object 708 of FIG. 7A. The path attribute of this Model Navigator object has a value "clients". This value of the path attribute indicates that, in the present view, the objects that should be displayed at the next tree level below the "current" or "originating" application object class (i.e. Bank objects) are Client objects. In other words, this setting indicates that all Client application objects associated with a Bank application object are to be considered the children of the Bank object for the purposes of the present view. The value "clients" is indicative of this because it is the rolename associated with the uni-directional association 312 leading from Bank class 302 to Client class 306 (FIG. 3). Accordingly, in the instant tree display of the application objects 44, Client objects instances will be indented below their associated Bank object instance (see, e.g., Client object instances 803, 809 indented one level below Bank object instance 801).

Figure 9A:
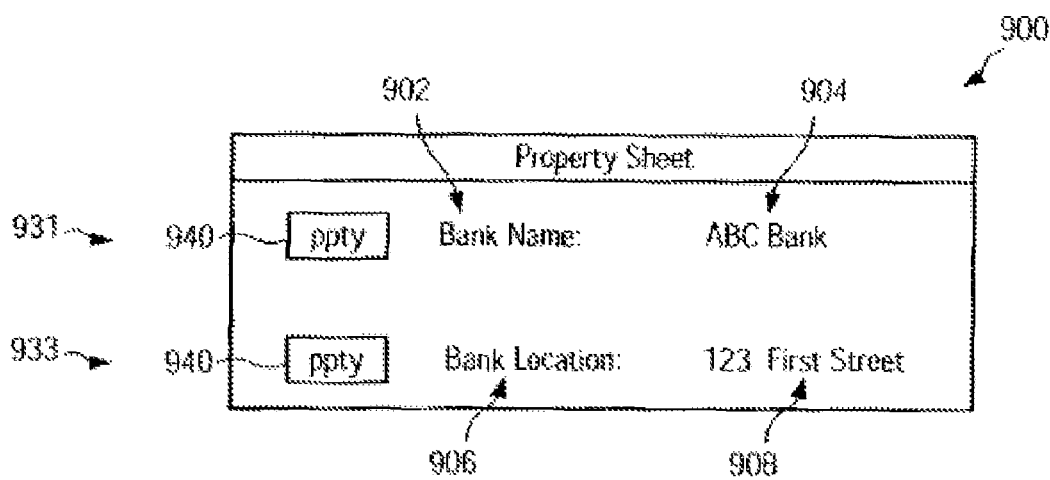
FIGS. 9A, 9B and 9C each illustrate the display of a property sheet for one of the objects of FIG. 4 by the editor of FIG. 1 when configured with the CMI of FIG. 7A.

Further included within the first Model Item declaration are two Property objects declarations (at lines 8-9 and 10-11, respectively) which determine, for the purposes of the present view, which attributes of a Bank object are to be displayed in a property sheet of a selected Bank object instance. The property sheet 900 that is defined on the basis of these Property object declarations is illustrated in FIG. 9A. The first Property object declaration (corresponding to object 710 of FIG. 7A) has name attribute with a value "name", a displayName attribute with a value "Bank Name" and an icon attribute with the value "ppty.gif". These values indicate that the property sheet associated with a selected Bank object instance shall include one entry 931 comprising a line item made up of the value of the corresponding Bank object's name attribute (i.e. the bank name 904) preceded by the text "Bank Name" 902 to indicate the what the displayed value represents and including an icon 940 from file "ppty.gif". In similar fashion, the second Property object declaration (corresponding to Property object 712) indicates that the property sheet shall include another entry 933 made up of the value of the corresponding Bank object's location attribute (i.e. the bank address 908) preceded by the text "Bank Location" 906. As may be seen in FIG. 9A, the bank name property is displayed above the bank location property within the property sheet 900; this ordering of entries in the displayed property sheet 900 is determined by the ordering of the Property objects 710, 712 within the Model Item object 706 of CMI file 36.

As may be seen at line 6 of FIG. 6A, the first Model Item declaration includes a label attribute with the value "Bank_name". This attribute constitutes a reference 736 (FIG. 7A) to the first Property object 710 (by way of that Property object's unique ID "Bank_name") and indicates that the attribute associated with the first Property object 710 (i.e. the bank name) is to comprise the "label" for displayed instances of the object represented by the containing Model Item 706 (i.e. Banks). This results in the display of the bank name 806, 826 (FIG. 8A) in conjunction with each displayed instance of a Bank object 801, 813 (respectively) after the displayName text "Bank:" 804.

In a similar fashion to the first Model Item's determination of all aspects of the display of Bank object instances, the second Model Item object declared at lines 14-19 of FIG. 6A (associated with Model Item object 714 of FIG. 7A) determines all aspects of the display of Client object instances for the present view. This includes determining the icon 808 "client.gif" to be displayed with each Client object instance 803, 809, 815, and 821. Second Model Item object 714 contains a Model Navigator object 716. The path attribute value "accounts" of this Model Navigator object indicates that the application objects that should be considered to be the children of Client objects in the present view are Account objects. The value "accounts" which provides this indication is the rolename of the bi-directional association 314 leading from Client class 306 to Account class 304 (FIG. 3A). Thus, in a tree display of the objects 44, Account object instances will be indented below their associated Client object instance (see, e.g., Account object instances 805, 807 indented one level below Client object instance 803).

The property sheet 910 that is displayed upon the selection of the Client object instance 803 is shown in FIG. 9A. This property sheet includes only a single attribute, namely the client's name, as dictated by the single contained Property object 718 declared at lines 17-18 of FIG. 6A. Moreover, because the "label" attribute references this property, the client's name is also displayed for each Client object instance of the tree display (see, e.g., the client name "John Smith" 812 displayed in association with Client object instance 803).

Following the same pattern as the first two Model Items, the third Model Item object declaration determines all aspects of the display of Account object instances for the present view. One distinction is that the path attribute of its contained Navigator object 728 (declared at line 27 of FIG. 6A) has a value "Navigator_nopath". This value indicates that Account object instances are considered to be at the lowest level of the present view, i.e. they are to have no children. Accordingly, Account object instances 805, 807, 811, 817, 819, 823 and 825 appear at the deepest level of indentation in the tree display of FIG. 8A. The two property object declarations at lines 23-26 result in the property sheet 920 of FIG. 9C for a selected Account object instance.

Figure 9B:
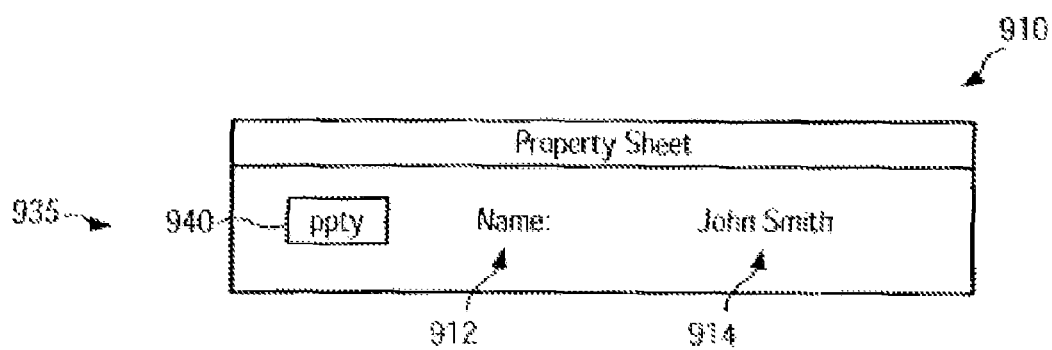
Figure 9C:
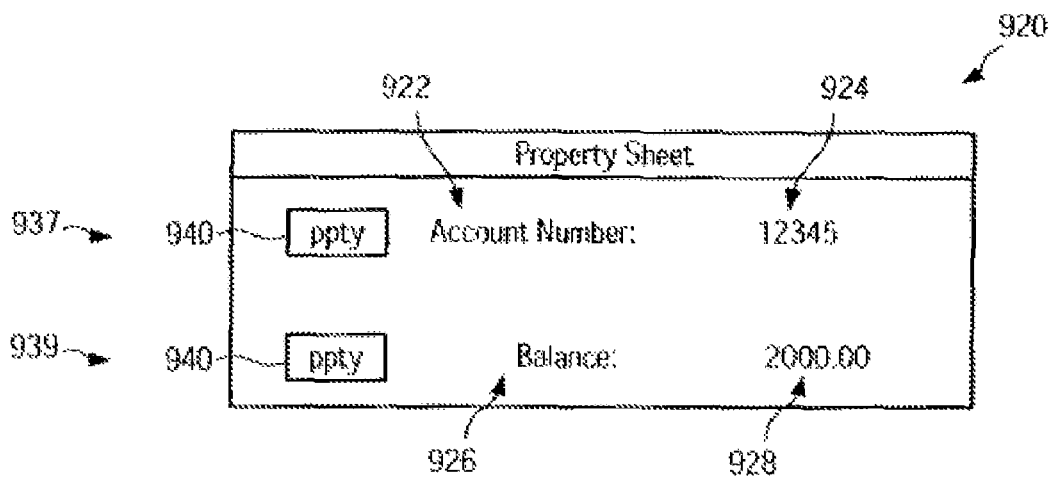

In another distinction from the first two Model Items, the label attribute of the third Model Item (at line 22) references a Property object that is not contained by the third Model Item, but rather is declared outside of that Model Item (at line 30). This relationship is illustrated in FIG. 7A in the form of label relationship 744 leading to Property object 720 (which is not contained by third Model Item's "properties" containment association 746). The referencing by the label association 744 of a Property object 720 that is not contained by the Model Item object 722 is done to permit the Account object attribute "name" (i.e. the account name) associated with the Property object 720 to be used as a "label" for each displayed instance of an Account object (see, e.g., corresponding displayed account names 818, 820, and 824 of FIG. 8A) without having that attribute appear within the Account object's property sheet 920 (FIG. 9C). This approach is again based on the fact only Properties that are contained by a Item/Model Item will be displayed in the associated property sheet.

Figure 6B:
FIG. 6B illustrates another saved CMI file based on the model of FIG. 5, also in XML format.
Figure 7B:
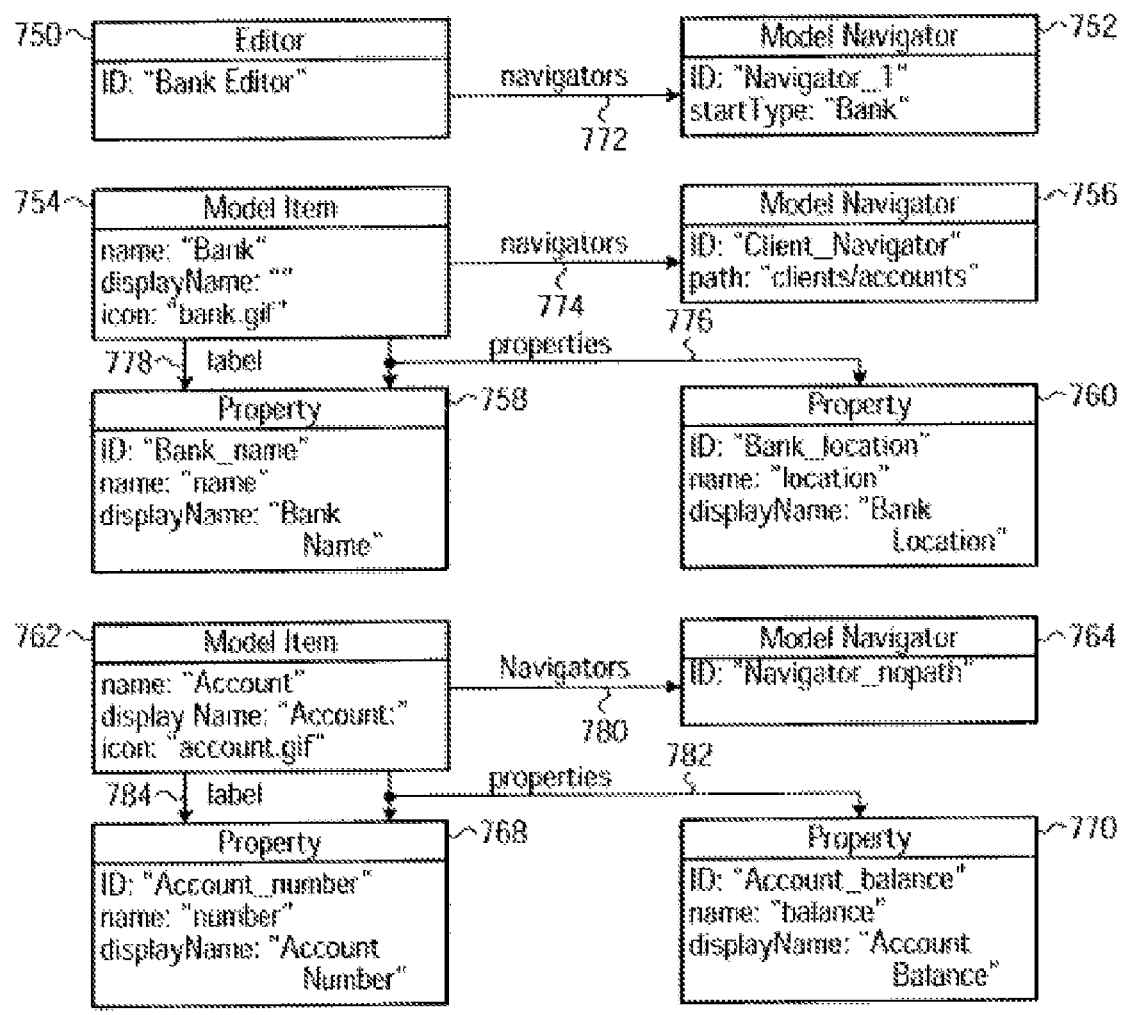
FIG. 7B illustrates an instantiated CMI based on the CMI file of FIG. 6B, which may be used to configure the editor of FIG. 1 to display the objects of FIG. 4 according to an alternative view.
Figure 8B:
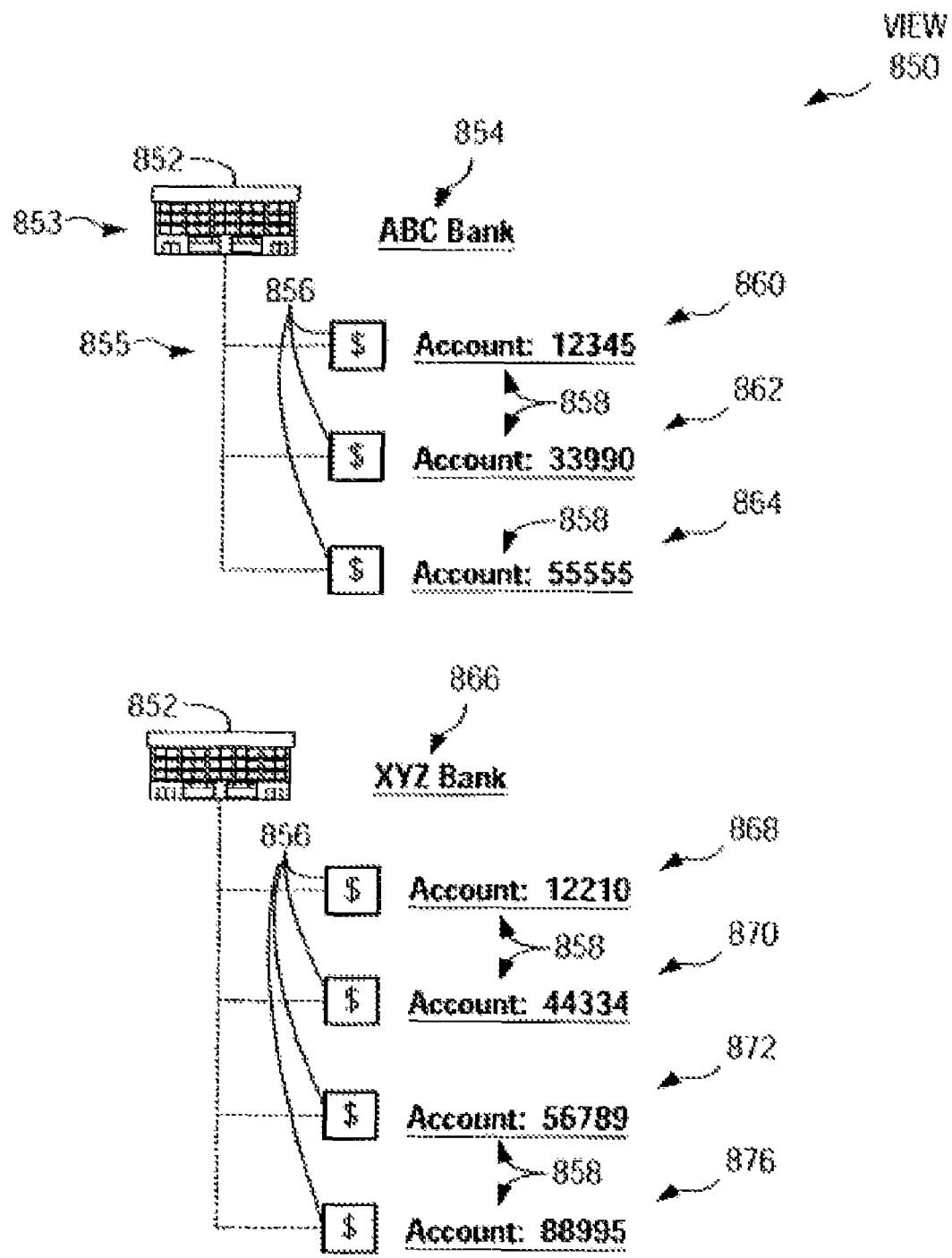
FIG. 8B illustrates the display of the objects of FIG. 4 by the editor of FIG. 1 when configured with the CMI of FIG. 7B.

FIG. 6B illustrates the contents of the CMI file 34 which defines an alternative view 850 (FIG. 8A) of the software objects 44. FIG. 6B is best viewed in conjunction with FIGS. 7B and 8B, which are analogous to FIGS. 7A and 8A, described above.

CMI file 34 follows the same conventions described above with respect to CMI file 32 and will therefore not be described in detail. CMI file 34 includes declarations for two Model Item objects at lines 5-12 and 14-21, which declarations correspond with Model Item objects 754 and 762, respectively, of FIG. 7B. It should be appreciated that the declaration of only two Model Item objects 754 and 762 and the associated Model Navigators 752 and 756, which permit the associated application objects to be accessed or "navigated to", results in the display of only two types of application objects 44 in the view 850, namely Bank objects and Account objects.

Certain other aspects of CMI file 34 result in a view 850 of the objects 44 that is different from the view 800 provided by CMI file 32. For example, the setting of the displayName attribute to an empty string value at line 5 (FIG. 6B) results in the absence of any textual label preceding the bank name (see, e.g., Bank object instance 853 of FIG. 8B). Moreover, the setting of the "label" association 784 (FIG. 7B) of the second Model Item object 762 to reference the account number Property object 768 (as declared at line 15 of FIG. 6B) has caused the account number to appear in association with each Account object instance rather than the account name (see, e.g., account number 860 ("12345") displayed in association with Account object instance 855).

Another distinction from the CMI file 32 of FIG. 6A is the use of a sequence of rolenames "clients/accounts" in the path attribute of the first Model Item (at line 7 of FIG. 6B). This value of the path attribute indicates that, in this alternative view, the objects that should be displayed at the next tree level below the "current" application object class (i.e. Bank objects) are Account objects (see, e.g., Account object instance 855 nested below its associated Bank object instance 853 in FIG. 8B). It should be appreciated that this technique makes it possible to cause application objects which are only indirectly associated in the governing application model 300 to appear to have a parent/child relationship in the instant view. This is a powerful technique for controlling the appearance of the displayed objects 44, or more generally, for controlling the navigation of objects 44.

The operation of the object editor 10 is illustrated in the sequence diagram of FIG. 10. It is assumed that, prior to invocation of the editor 10, a CMI file, such as CMI file 32, has been stored in a predetermined location in non-volatile memory 26 as expected by the core editor code 38.

Initially, a user 18 invokes the editor software 46 through interaction with the UIM 20. Upon being invoked, the editor software 46 commences its initialization by reading the CMI file 32 from the predetermined location and de-serializes the file, resulting in the CMI 36 illustrated in FIG. 7A. This effectively "customizes" the editor 10 for use with the set of application objects stored in file 30. Once the editor has completed its initialization, the user 18 then further interacts with the UIM 20 to request the application objects 44 stored in file 30 to be loaded into the editor for editing. As a result, the file 30 is similarly de-serialized, resulting in the instantiated set of application objects 44 of FIG. 4. The user's request also triggers a default display of the objects in tree form on the display 16 of the editor 10.

With reference to FIG. 10, the core editor code 38 initiates this default display of the application objects 44 by way of the invocation 1004 of a tree viewer 51 routine displayAsTree( ) (or logically comparable routine in the operative UI framework 40), with the application objects 44 being passed as an input parameter. In response, the tree viewer 51 makes a call 1006 to the getRootObjects( ) method of the CMI 36 which, as described above, returns the application objects which will serve as root objects for the present view. Given the operative CMI 36 of FIG. 7A in the present example, this method returns the two Bank objects 402 and 452 of FIG. 4. Subsequently, there is a further invocation (not illustrated) of the getAdapterFactory( ) method of the CMI 36, which returns the currently operative adapter factory 39 to the controller module 41, again as described above. At this stage, processing enters a loop 1034 wherein each of the returned "root" Bank objects 402 and 452 and their children are processed in a recursive manner.

Starting with the first Bank object 402, the tree viewer 51 begins by making a call 1008 to the controller module routine getChildren (or logical equivalent in the controller module 41 of the operative UI framework 40) to determine the children of Bank object 44 for the present view. In response, the controller module 41 makes a call 1010 to the adapter factory method adapt( ), passing the Bank object 402 as a parameter, to identify the proper adapter to use for this class of application object. The adapter factory 39 in turn invokes the getAdapter( ) method (described above) of the CMI 36 at 1012, to identify the proper adapter for Bank objects. In the present case, as no custom adapter or custom generic adapter is specified for Bank objects in the CMI 36, the getAdapter( ) method returns the default generic adapter 42.

Thereafter, the controller module 41 makes a call 1014 to the getChildren( ) method of the generic adapter 42, passing the Bank object 402 as a parameter. In response, the adapter 42 invokes at 1016 the getNavigators( ) method of the CMI 36. As noted previously, this method returns the navigator(s) associated with the input parameter object's class. In the present case, the Model Navigator object 708 is returned. The value of the returned Model Navigator's path attribute is thereafter examined and discovered to have the value "clients". The corresponding feature is then passed to the relevant MOF "parent" application object 1002 (which in the present case is Bank object 402) in an invocation 1018 of the MOF refvalue( ) method. The matching associations, which comprise the Bank's associated Client objects 404 and 406 in the present case, are then returned. These objects are ultimately returned to the tree viewer 51.

Having obtained the children of the first "root" Bank object 402, the tree viewer 51 next seeks to determine the text to be displayed in association with the displayed instance of Bank object 402. The object interactions which occur to effect this result are in many ways similar to the above noted steps by which the children of Bank object 402 were determined. More specifically, the tree viewer 51 initially makes a call 1020 to a getText( ) method (or logical equivalent) of the controller module 41, passing the Bank object 402 as a parameter. Thereafter, in a pair of calls 1022 and 1024 to the adapt( ) and getAdapter( ) methods, the generic adapter 42 is returned as the adapter to be used for the current Bank object. The controller module 41 then makes a call 1026 to the getText( ) method of the generic adapter 42, passing the Bank object 402 as a parameter. In response, the adapter 42 invokes (at 1028) a getLabel( ) method of the CMI 36 which, in a mechanism similar to that of the getAdapter( ) method, returns the label association for input parameter's application model class. In the present case, the returned label association 736 (FIG. 7A) identifies the Property object 710 associated with the Bank object's name attribute. The feature associated with this bank name attribute then is then passed to the Bank object 402 in an invocation 1030 of the MOF refvalue( ) method, which examines the features of the Bank object 402 until one is found which matches this value. The resulting value "ABC Bank" is then returned.

Next, in an invocation 1032 of the CMI 36 method getDisplayName( ), the value of the displayName attribute for the Bank object (i.e. "Bank:") is returned. The mechanism of the getDisplayName( ) method is similar to that of the getLabel( ) method.

Finally, the displayName value and the Bank name value are concatenated into a single string "Bank: ABC Bank" and returned, ultimately to the tree viewer 51, for display. Next, in processing that is similar to the series of invocations associated with the getText( ) mechanism, the tree viewer 51 invokes a getIcon( ) method (not illustrated) of the controller module 41 to determine the appropriate icon to be displayed in association with the displayed instance of the Bank object 402.

Having at this stage determined the children of Bank object 402 as well as the text and icon to be displayed for this object, the tree viewer 51 now recursively repeats the same series of steps (i.e. invoking getChildren( ), getText( ) and getIcon( )) for each child of the root Bank object 402, to determine the next level of children and associated text/icons to be displayed. This recursion is repeated until all of the objects designated for navigation by the CMI 36 have been traversed. When completed, the information needed by the tree viewer 51 to compose the upper portion 840 (FIG. 8A) of the view 800 is known, and this portion 840 may be displayed on display 16 (FIG. 1).

In an analogous manner, the remaining application objects 44 are traversed, ultimately resulting in the display of the other portion 842 (FIG. 8A) of the view 800. At this point there are no further root objects left to process, so the exit condition to the loop 1034 (FIG. 10) is met and processing associated with the displaying of the view 800 is completed.

It should be appreciated that the processing described above differs slightly when a non-reflective object is encountered among the application objects 44. In particular, the adapter returned by the CMI getAdapter( ) method call 1012 will be a custom adapter 43, not the generic adapter 42. Moreover, the controller module's subsequent invocation of the custom adapter's getChildren( ) method (analogous to call 1014) will result in the custom adapter 43 invoking a method or methods of the relevant non-reflective application object 1002 (in place of calls 1016 and 1018) which comprise(s) a "hard-coding" of the desired results. The same is true of the processing associated with the getText( ) and getIcon( ) methods for a non-reflective application object.

When the user 18 selects a displayed instance of a displayed application object to view its properties, this selection event will cause a property sheet (e.g. 900, 910 or 920 of FIGS. 9A-9C) associated with the object to be displayed. The processing to effect this display is similar to the tree viewer processing described above and will therefore not be described in detail. One difference from the tree viewer processing, however, is the fact that the property sheet viewer 53 construct, not the tree viewer 51, is used. Another difference is that no recursive accessing of the set of application objects 44 occurs.

When reflective application software objects 44 are edited, the MOF reflective module method refSetValue may be invoked by the generic adapter 42 to set the value of the objects' features as necessary.

Once the user 18 has viewed and/or edited the objects as needed, the user 18 may use the GUT to trigger a "save" command which causes the application objects 44 to be serialized and stored back to the file 30. The object editor 10 may then be exited.

Optionally, the user 18 may now substitute a different CMI file, such as CMI file 34, into the predetermined location in non-volatile memory 26. When the object editor 10 is subsequently invoked, it will be configured by way of the substituted CMI file 34 to display application objects 44 in accordance with the alternative view 850 illustrated in FIG. 8B. Advantageously, this configuration of the generic adapter 42 is achieved without necessitating a recompilation of the generic adapter 42.

As will be appreciated by those skilled in the art, modifications to the above-described embodiment can be made without departing from the essence of the invention. For example, rather than reading a CMI file 32 or 34 from a predetermined location of non-volatile memory 26 to configure the editor 10, an alternative manner of configuring the object editor 10 with a particular CMI 36, such as a command line parameter, may be used.

As well, it will be appreciated that the serialized CMI files 32, 34 may in fact comprise XML Metadata Interchange (XMI) documents, in accordance with section 2.4.3 of the above referenced MOF specification. As known to those skilled in the art, XMI is an extension of XML which provides a standard way for programmers and other users to exchange information about metadata which is described in XMI specification version 1.2 at http://www.omg.org/cqi-bin/doc?formal/02-01-01.pdf. When expressed in the form of XMI, CMI files 32, 34 may include many of the same object declarations as are declared in the exemplary XML version of FIGS. 6A and 6B, however may further include additional XMI related tags and attributes. For example, the CMI file 32 of FIG. 6A might appear as illustrated in FIG. 11 when expressed in XMI. In a similar fashion, the saved application objects 30 (FIG. 1) could be represented in XMI in an alternative embodiment.

In the event that the application objects 44 are all reflective, it is possible to use a configuration model 500 which does not define the classes (e.g. Navigator or Item) and attributes that are exclusively associated with non-reflective objects. Rather, the attributes of these classes may be promoted to the corresponding reflective object subclass (e.g. Model Navigator or Model Item).

Fundamentally, it is not necessary that the object editor 10 utilize MOF to implement reflection. An alternative reflection mechanism, such as Java™ reflection and/or introspection, may be used. In this case, it will be recognized that the application objects 44 will conform to the chosen reflection mechanism, and that the reflective API calls made within the generic adapter 42 (e.g. refMetaObject, refyalue, refSetValue, etc.) which access application objects/attributes in a generic fashion will be replaced with corresponding APIs that are appropriate for the chosen reflection mechanism.

As well, it should be appreciated that the above described approach of using a generic adapter 42 and an external CMI 36 could be used to implement an externally-configurable adapter software component for an application other than an object editor. In this case, the application's "main program" component may replace the core editor code 38; moreover, the high level UI constructs 47 and controller module 41 may not exist. Depending on the application, the methods of the main program to be mapped to the attributes or associations of application software objects 44 may differ from the described getChildren( ), qetText( ), and getIcon( ) methods; if this is the case, the generic adapter may require one-time modification to implement these different methods. Moreover, the CO configuration model on which the CMI 36 is based for such embodiments may include attributes particular to the application being implemented in place of (or in addition to) display-related model attributes (e.g. icon, displayName, etc.). For such embodiments, changing the CMI settings may cause the generic adapter 42 to access application software objects 44 differently and, accordingly, the application to behave differently, without necessitating adapter recompilation.

Of course, the above described embodiments are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

The embodiments of the inventions in which an exclusive property or privilege is claimed are defined as follows:

1. A method, in a data processing system, for configuring at least one adapter software component to selectively access a set of application software objects including at least one reflective application software object, comprising:
    accessing a configuration model instance (CMI) external to the adapter software component;
    determining, based on the CMI, individually for each application software object in the set of application software objects, whether a generic adapter software component of the at least one adapter software component is to be utilized or a custom adapter software component of the at least one adapter software component is to be utilized when rendering the application software object in an object editor;
    accessing the application software objects in the set of application software objects using one of the generic adapter software component or a custom adapter software component in a manner specified by the CMI to provide a view for representing properties of the application software objects in the object editor; and
    presenting the view of the application software objects in the object editor, wherein the CMI comprises at least one of a navigator class comprising attributes which provide access to the custom adaptor for accessing a particular class of application software objects of the set of application software objects or a model navigator class comprising attributes which provide access to the generic adapter for accessing a particular class of reflective application software objects of the set of application software objects.

2. The method of claim 1, wherein the CM1 comprises:
    at least one class identifying the set of application software objects that may be accessed when representing the set of application software objects using the CMI; and
    a get adapter method that determines, individually for each application software object in the set of application software objects, whether the generic adapter software component or a custom adapter software component is to be utilized when rendering said application software object.

3. The method of claim 1, wherein the navigator class or a descendent thereof comprises an indicator for indicating that the particular class of application software objects is at a root level of the set of software objects.

4. The method of claim 1, wherein the navigator class or a descendent thereof comprises an indicator for indicating that the particular class of application software objects is at a level that is deeper than a root level of the set of application software objects.

5. The method of claim 4, wherein the indicator comprises a sequence of application software object associations comprising at least one association from an originating class of application software objects to the particular class of software objects.

6. The method of claim 1, wherein the CMI comprises at least one of an item class representative of a particular class of application software objects to be accessed or a model item class representative of a particular class of reflective application software objects to be accessed.

7. The method of claim 6, wherein the item class or a descendent thereof comprises an indicator of a custom adapter software component to be used to access application software objects of the particular class.

8. The method of claim 6, wherein the item class or a descendent thereof comprises at least one of an indicator of an icon to be displayed in conjunction with displayed instances of the particular class of application software objects or an indicator of text to be displayed in conjunction with displayed instances of the particular class of application software objects.

9. The method of claim 1, wherein the CMI comprises a property class representative of an attribute of a particular class of application software objects to be accessed.

10. The method of claim 9, wherein the property class or a descendent thereof comprises at least one of an indicator of an editor to be used to edit the attribute and an indicator of whether instances of the attribute are modifiable.

11. The method of claim 9, wherein the property class or a descendent thereof comprises at least one of an indicator of an icon to be displayed in conjunction with displayed instances of the attribute or an indicator of text to be displayed in conjunction with displayed instances of the attribute.

12. The method of claim 1, wherein the manner of accessing the application software objects indicated by the CMI comprises an indication of an attribute of the application software objects to be accessed.

13. The method of claim 1, wherein the manner of accessing the application software objects indicated by the CMI comprises an indication of an associated application software object of the application software objects to be accessed.

14. The method of claim 13, wherein the associated application software object is contained by the application software objects.

15. The method of claim 13, wherein the application software object is based on an object oriented application model, and wherein the indication of an associated application software object to be accessed comprises a sequence of rolenames comprising at least one rolename from an originating class of the object oriented application model to the class of the associated application software object.

16. An apparatus for configuring at least one adapter software component to selectively access a set of application software objects including at least one reflective application software object, comprising:
    a processor; and
    a memory coupled to the processor, wherein the memory comprises instructions which, when executed by the processor, cause the processor to:
        access a configuration model instance (CMI) external to the adapter software component;
        determine, based on the CMI, individually for each application software object in the set of application software objects, whether a generic adapter software component of the at least one adapter software component is to be utilized or a custom adapter software component of the at least one adapter software component is to be utilized when rendering the application software object in an object editor;

access the application software objects in the set of application software objects using one of the generic adapter software component or a custom adapter software component in a manner specified by the CMI to provide a view for representing properties of the application software objects in the object editor; and present the view of the application software objects in the object editor, wherein the CMI comprises at least one of a navigator class comprising attributes which provide access to the custom adaptor for accessing a particular class of application software objects of the set of application software objects or a model navigator class comprising attributes which provide access to the generic adapter for accessing a particular class of reflective application software objects of the set of application software objects.

17. A computer program product comprising a computer useable medium having a computer readable program, wherein the computer readable program, when executed on a computing device, causes the computing device to:

access a configuration model instance (CMI) external to the adapter software component;

determine, based on the CMI, individually for each application software object in the set of application software objects, whether a generic adapter software component of the at least one adapter software component is to be utilized or a custom adapter software component of the at least one adapter software component is to be utilized when rendering the application software object in an object editor;

access the application software objects in the set of application software objects using one of the generic adapter software component or a custom adapter software component in a manner specified by the CMI to provide a view for representing properties of the application software objects in the object editor; and present the view of the application software objects in the object editor, wherein the CMI comprises at least one of a navigator class comprising attributes which provide access to the custom adaptor for accessing a particular class of application software objects of the set of application software objects or a model navigator class comprising attributes which provide access to the generic adapter for accessing a particular class of reflective application software objects of the set of application software objects.

* * * * *